US012220994B2

(12) United States Patent
Fisher et al.

(10) Patent No.: US 12,220,994 B2
(45) Date of Patent: Feb. 11, 2025

(54) APPARATUS, SYSTEMS AND METHODS FOR UNMANNED AERIAL VEHICLES

(71) Applicant: Foundation Productions, LLC, San Francisco, CA (US)

(72) Inventors: James Mark Fisher, Walnut Creek, CA (US); Bryan Jonathan Davis, San Francisco, CA (US); Ronald Eugene Fisher, San Francisco, CA (US)

(73) Assignee: FOUNDATION PRODUCTIONS, LLC, San Francisco, CA (US)

( * ) Notice: Subject to any disclaimer, the term of this patent is extended or adjusted under 35 U.S.C. 154(b) by 82 days.

(21) Appl. No.: 17/869,886

(22) Filed: Jul. 21, 2022

(65) Prior Publication Data
US 2022/0371454 A1    Nov. 24, 2022

Related U.S. Application Data

(63) Continuation of application No. 16/512,910, filed on Jul. 16, 2019, now Pat. No. 11,413,974, which is a
(Continued)

(51) Int. Cl.
*B60L 53/00* (2019.01)
*B60L 53/51* (2019.01)
(Continued)

(52) U.S. Cl.
CPC .............. *B60L 53/00* (2019.02); *B60L 53/51* (2019.02); *B64F 1/222* (2013.01); *B64U 70/90* (2023.01);
(Continued)

(58) Field of Classification Search
CPC .......... B60L 53/00; B60L 53/51; B60L 53/12; B60L 53/126; B60L 53/52; B64C 39/024;
(Continued)

(56) References Cited

U.S. PATENT DOCUMENTS 11,156,010 B1 * 10/2021 Corban .................... B64D 5/00

* cited by examiner

*Primary Examiner* — Michael V Kerrigan
(74) *Attorney, Agent, or Firm* — Franklin & Associates International Inc; Matthew F. Lambrinos

(57) ABSTRACT

The disclosed inventions include personal Unmanned Aerial Vehicles (UAV's) and UAV universal docking ports "docking ports" to be incorporated into and/or attached to headwear, including helmets, hard hats and hats and face masks, as well as footwear including boots and shoes, clothing and outerwear, devices, gear and equipment, land, air, water and space vehicles, buildings, wireless towers and other mobile or stationary objects and surfaces referred to collectively as "docking stations". A docking station may have one or more docking ports for docking, networking and charging or refueling compact personal UAVs, and for providing data communications between said UAVs and other electronic devices that remain with the person while the UAV is in flight or driving or landed on terrain. Said docking ports may also incorporate wireless power transmission for remote wireless charging of one or more UAV's. Supplemental power for recharging said UAVs when docked may be supplied by integrated battery(s) in said docking port or me be provided directly from the docking station or other connected power source.

20 Claims, 24 Drawing Sheets

Related U.S. Application Data continuation of application No. 15/001,232, filed on Jan. 19, 2016, now Pat. No. 10,370,122.

(60) Provisional application No. 62/104,836, filed on Jan. 18, 2015.

(51) Int. Cl.
  *B64F 1/222*     (2024.01)
  *B64U 70/90*     (2023.01)
  *G05D 1/00*      (2006.01)
  *B64U 30/26*     (2023.01)
  *B64U 50/37*     (2023.01)
  *B64U 60/70*     (2023.01)
  *B64U 80/60*     (2023.01)
  *B64U 80/80*     (2023.01)
  *B64U 101/30*    (2023.01)

(52) U.S. Cl.
  CPC ............ *G05D 1/0011* (2013.01); *B64U 30/26* (2023.01); *B64U 50/37* (2023.01); *B64U 60/70* (2023.01); *B64U 80/60* (2023.01); *B64U 80/80* (2023.01); *B64U 2101/30* (2023.01); *B64U 2201/20* (2023.01)

(58) Field of Classification Search
  CPC ....... B64C 39/028; B64C 39/02; B64F 1/222; B64F 1/04; B64F 1/22; G05D 1/0011; B64U 10/13; B64U 30/20; B64U 50/19; B64U 70/00; B64U 80/60; B64U 2101/30; B64U 70/90; B64U 30/26; B64U 50/37; B64U 60/70; B64U 80/80; A42B 3/04; B64D 5/00
  See application file for complete search history.

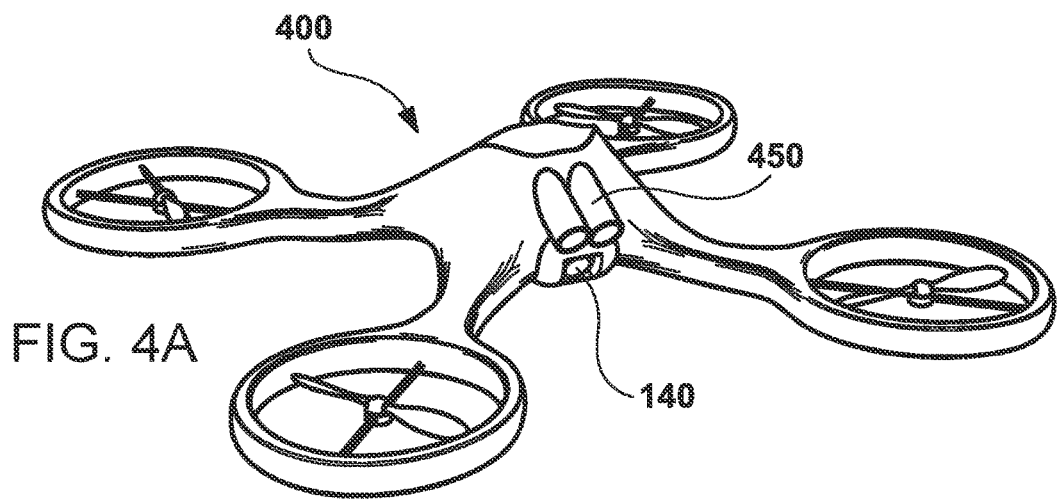
FIG. 4A
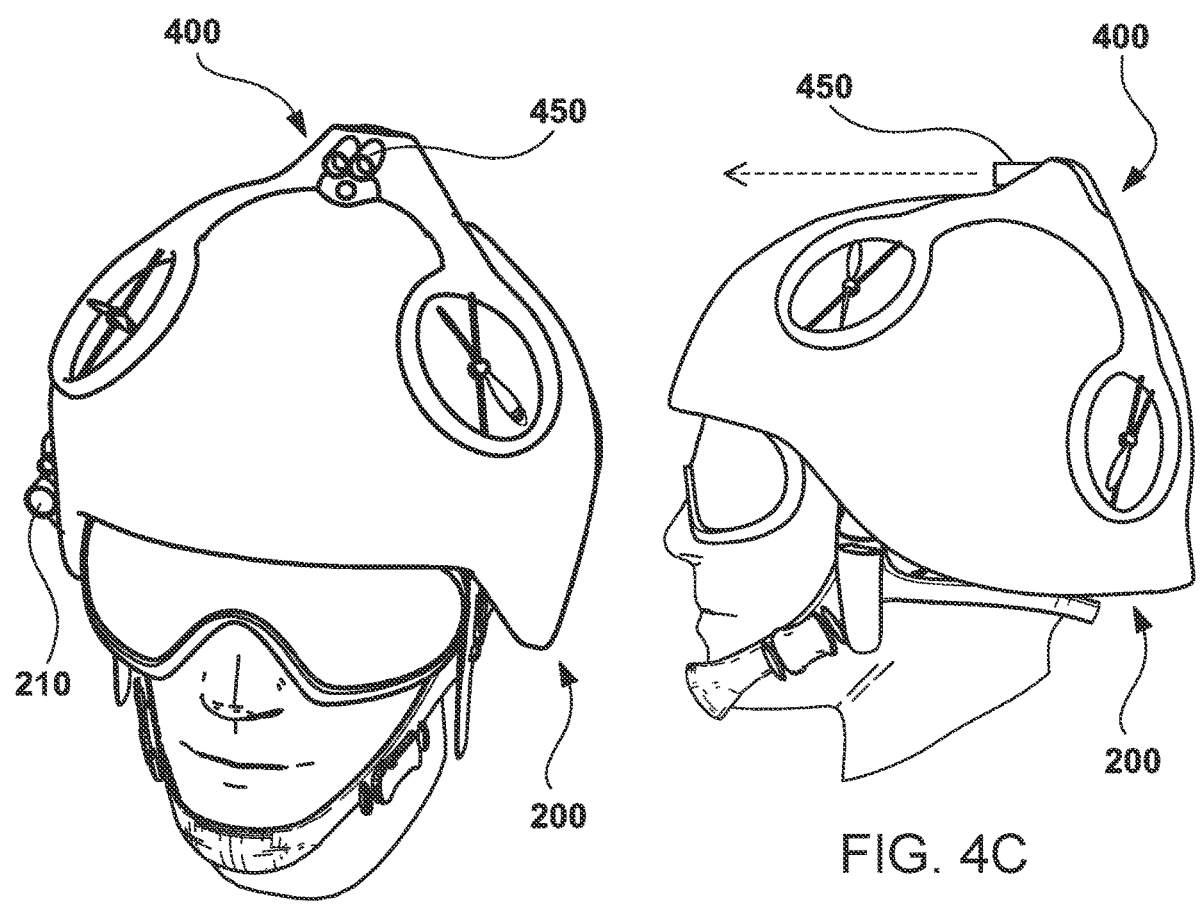
FIG. 4B
FIG. 4C

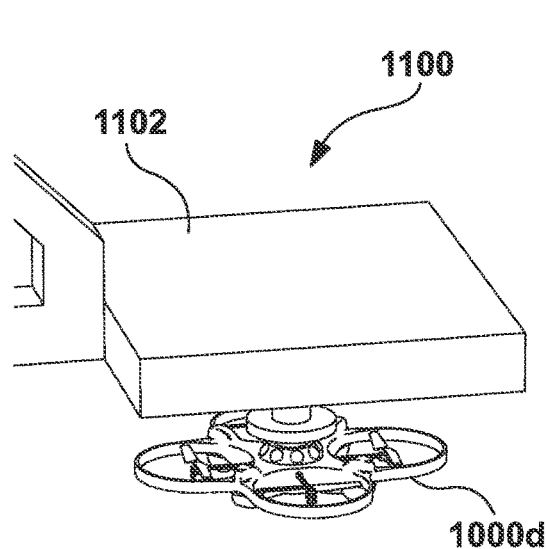
FIG. 17A
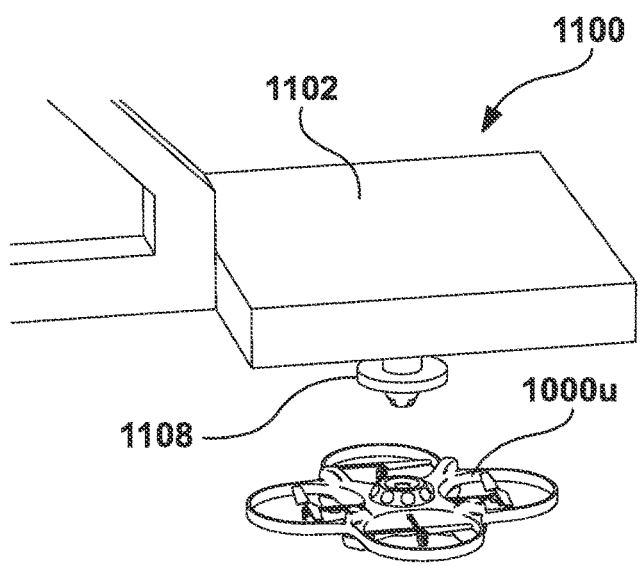
FIG. 17B
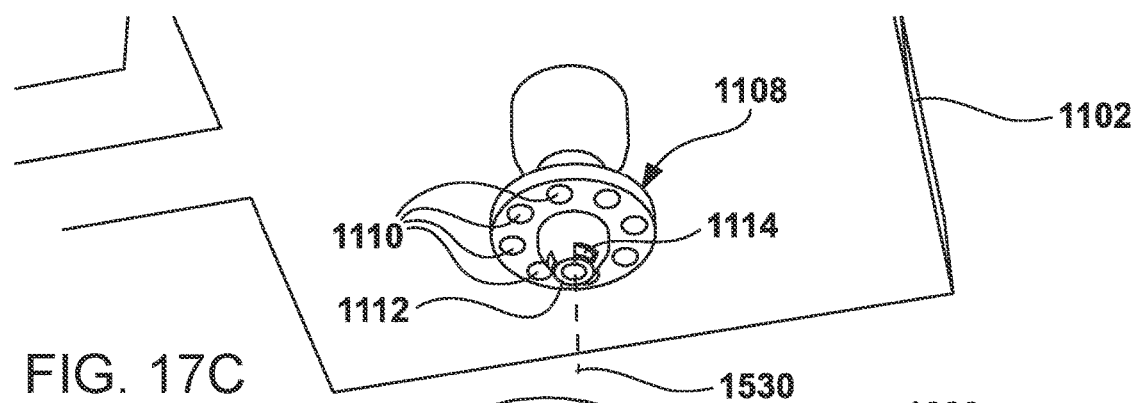
FIG. 17C
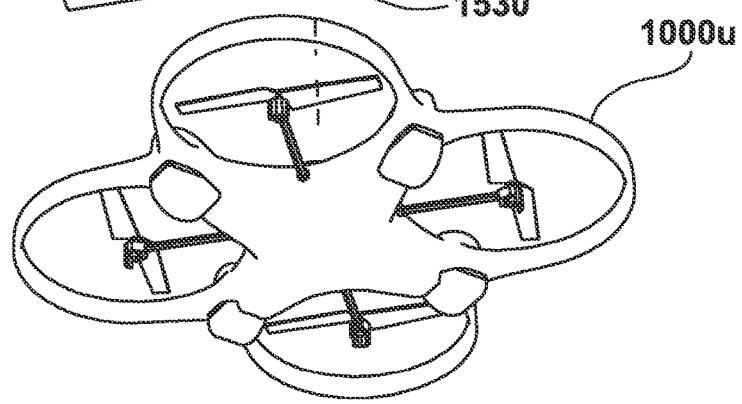

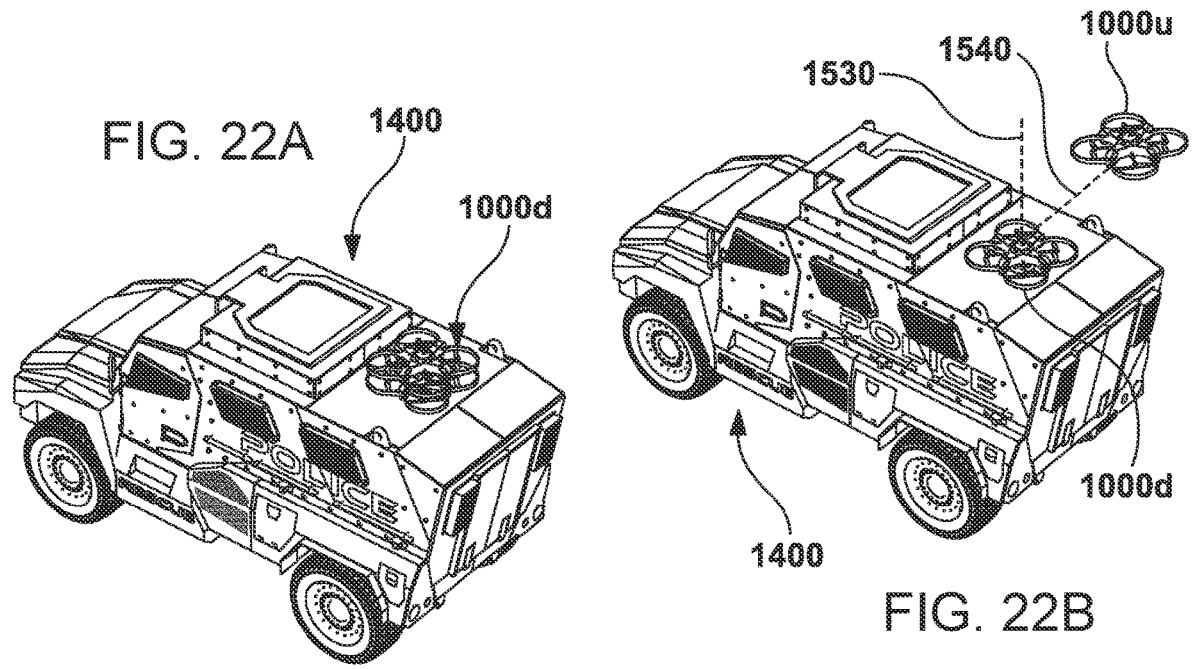
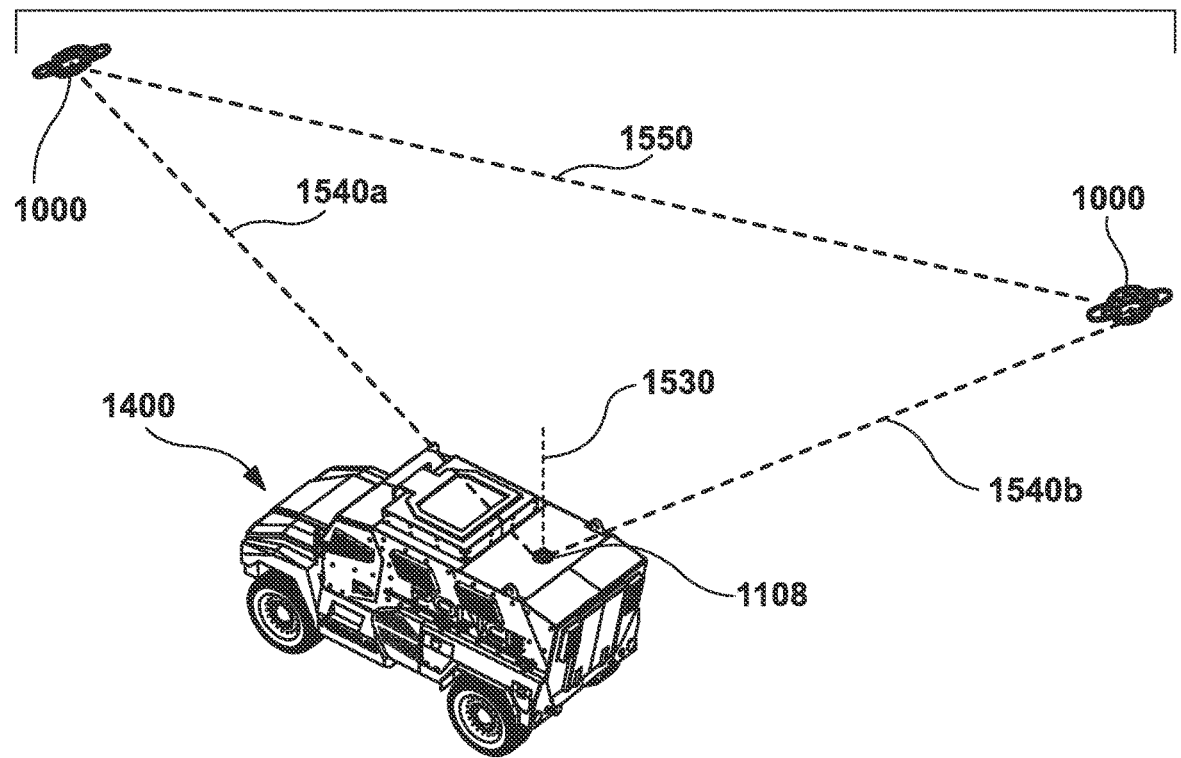

FIG. 25

Autonomous & Semi-autonomous tracking, communications, and docking between drones and docking bases: — 1800

Find general dock location using: GPS, radio communications, line of sight detection of emissions (IR/laser/radio/light emissions, visual identification of markers/patterns, etc.), and/or predictive analysis based on mission plan, behavioral learning, etc. — 1810

Dock is located, track its movements using: radio communication, visual monitoring/pattern recognition, IR/laser/light emitter(s), etc. — 1812

Decide whether to dock based on factors such as Battery low, direct command, mission accomplished, adverse weather/conditions, etc.) — 1814

Docking: Lock onto dock emitter beam and approach dock and/or use additional means such as triangulation on emitters/markers, visual/pattern recognition, etc., to track dock and if required determine radial orientation of drone relative to the dock if necessary. — 1816

Once docked, engage locking mechanism, deactivate drone propulsion, and begin charging and wired communication with dock processors. — 1818

APPARATUS, SYSTEMS AND METHODS FOR UNMANNED AERIAL VEHICLES

CROSS REFERENCE TO RELATED APPLICATIONS

This application is a continuation of U.S. Non-Provisional application Ser. No. 16/512,910, filed Jul. 16 2019, which is a continuation of U.S. Non-Provisional application Ser. No. 15/001,232, filed Jan. 19 2016, now U.S. patent Ser. No. 10/370,122, issued Aug. 6 2019, which claims priority to provisional application Ser. No. 62/104,836, filed Jan. 18, 2015, each of the aforelisted applications being incorporated herein in its entirety by this reference thereto.

TECHNICAL FIELD

This invention relates to the fields of unmanned aerial vehicles (UAV's), docking ports, systems, vehicles and stations and wearable computing including but not limited to wearable devices, clothing, gear, equipment and other attire. More particularly, the invention relates to a system and method for autonomous UAV operations, flight, navigation, networking, docking, launching, charging and wireless power transfer, induction, management and distribution.

BACKGROUND

Compact personal unmanned aerial vehicles (UAV's) can take a variety of forms. They generally must be carried and launched by hand, manually operated and charged with limited power and range and are often stored in portable containers. This makes them inconvenient for rapid launching, long range travel, autonomous operation, docking, charging and storage. For many applications in which UAVs can be useful assistants such as in urban settings for monitoring personal security, traffic, law enforcement, package delivery, media broadcasting and entertainment such as filming and sporting events and remote settings such as hiking, camping, emergency medical and military applications, the users thereof need to keep their hands free for other applications.

SUMMARY

An Unmanned Aerial Vehicle (UAV) and UAV universal docking, networking and charging port "docking port(s)" apparatus and method for autonomous UAV operations including but not limited to launch, flight, navigation, networking, docking, charging and wireless power transfer, induction, management and distribution from one or more wearable, mobile, vehicular, stationary or other docking, networking and charging station "docking station(s)". Embodiments of the invention enable continuous light and optical depth mapping and imaging of the UAV environment, IR and laser guidance for autonomous flight navigation and docking at any angle and a method for in-flight wireless data networking and wireless power transfer, induction, charging and distribution.

BRIEF DESCRIPTION OF THE DRAWINGS

FIG. 4A depicts a UAV with camera and projectile launcher.

FIGS. 4B & 4C depict a UAV docked onto a user's helmet and with camera and projectile launcher able to function while docked.

FIGS. 13A & 3B depicts clothing or outerwear with an integrated UAV docking port and UAV with charging and data connectivity capabilities.

FIG. 17A depicts UAV docking station capable of docking, networking and charging or refueling multiple UAVs concurrently and shows a close-up view of the UAV docking station with a docked UAV.

FIGS. 17B & 17C depict a UAV docking station capable of docking, networking and charging or refueling multiple UAVs concurrently and show a close-up view of the UAV docking station with an undocked UAV departing or approaching a docking port.

FIG. 22A depicts a mobile vehicle-mounted UAV docking station, with UAVs capable of autonomous, semi-autonomous or remote controlled operations and shows a vehicle with the UAV docking station and a plurality of UAVs docked with said station.

FIG. 22B depicts a mobile vehicle-mounted UAV docking stations, with UAVs capable of autonomous, semi-autonomous or remote controlled operations and shows a vehicle with the UAV docking station with a UAV docked and another UAV approaching to dock with or departing from said station.

FIG. 22C depicts a mobile vehicle-mounted UAV docking stations, with UAVs capable of autonomous, semi-autonomous or remote controlled operations and shows a vehicle with the UAV docking station and with a plurality of flying UAVs tracking the position of the docking station and each other's positions, while also communicating with each other and the docking station.

FIG. 25 illustrates some of the capabilities and considerations in autonomous UAV operations and docking.

Figure 1A:
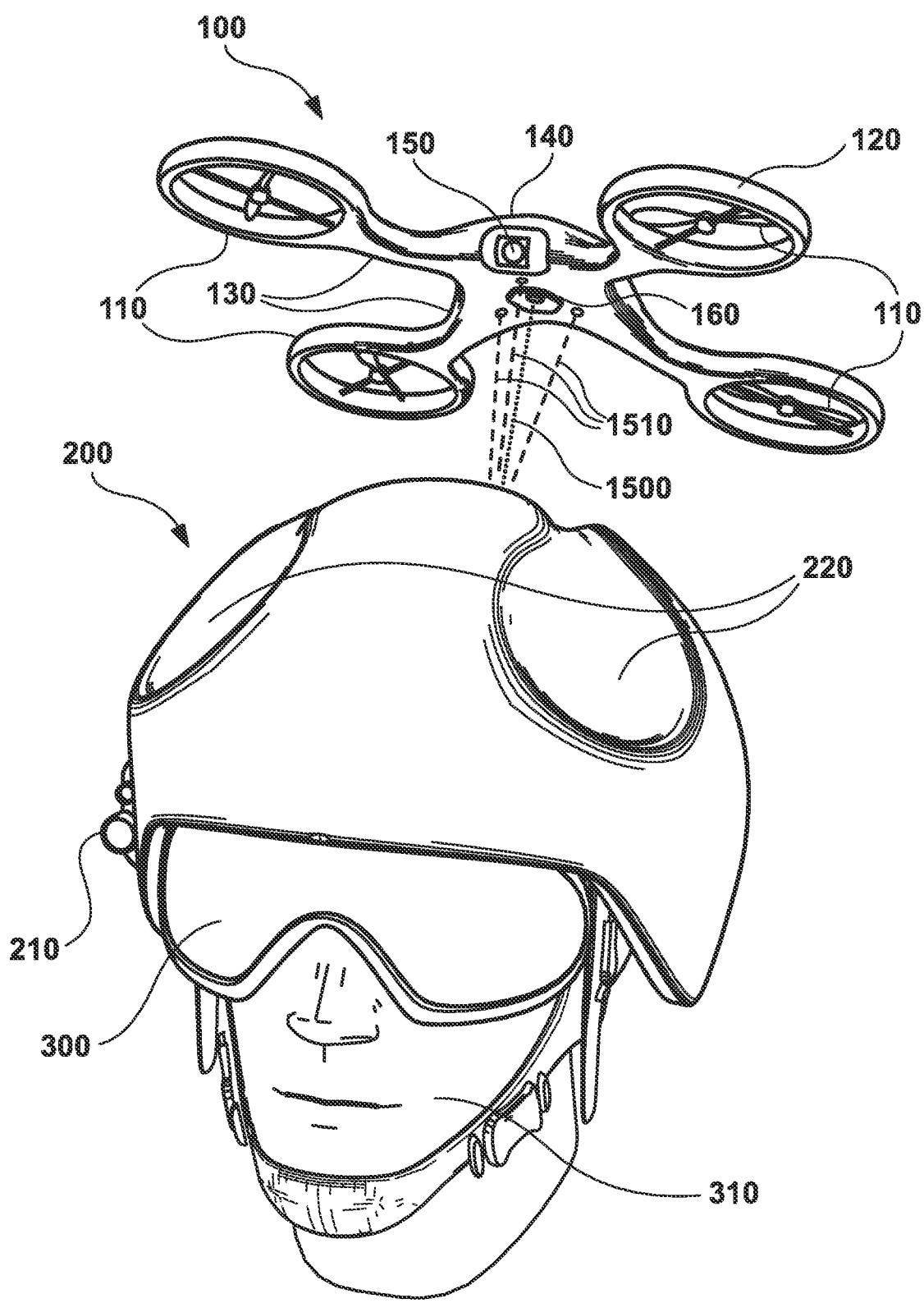
FIG. 1A illustrates a perspective view of a helmet and UAV control and guidance system with a docking port for a compact personal UAV, which is depicted in flight over said helmet.

Throughout the description, similar or same reference numbers may be used to identify similar or same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION OF PREFERRED EMBODIMENTS

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

A need has been identified for hands-free wearable UAV's capable of fully autonomous operation including but not limited to launch, flight, navigation, networking, docking and charging and a method for remote wireless power transfer, induction, management and distribution for continuous long range UAV travel, overcoming the limitations of battery and fuel storage is apparent.

Technical features described in this application can be used to construct various embodiments of apparatus, systems and methods for unmanned aerial vehicles. An Unmanned Aerial Vehicle (UAV) with one or more universal docking, networking and charging ports "docking port(s)". A universal UAV docking port is designed for attachment to and/or incorporation into a wide array of clothing, equipment, devices, vehicles, buildings and other mobile and stationary objects for the purpose of serving as a docking station "docking station(s)" for one or more UAV's. The docking port may incorporate light emitters and sensors and/or one or more cameras for real-time light and optical depth mapping and imaging of all objects in its field of view. The light imaging system may include a laser range finding system capable continuously identifying the precise relational position and distance to the docking port of one or more UAV's and/or other docking stations. The light and optical imaging and/or laser guidance system may also be used for data networking and wireless power transmission.

In embodiments of the invention the docking port of the UAV and/or docking station may also incorporate an accelerometer for measuring the motion and speed of the UAV and/or docking station. The docking port may incorporate an altimeter for measuring altitude. The docking ports on both the UAV and docking station ("docking ports") may also incorporate a compass and a multi-axis gyroscope for continuously identifying the directional motion, orientation and relative spatial position of the docking port and docking station. The docking ports on both the UAV and docking station may also incorporate GPS modules for location positioning. The docking ports may also incorporate their own wide area wireless communications module for cellular and/or satellite communications and cellular location positioning. The docking ports may support their own satellite, cellular, WiMax, WiFi or other wide or local area Internet connection. The docking ports may incorporate their own local area wireless communications modules for WiMax and/or WiFi communications, peer-to-peer networking and/or WiFi Hotspots and routers for one or more networked docking ports, docking stations and/or other networked devices, vehicles, equipment, clothing and/or body sensors. The docking ports may incorporate their own personal area wireless communications modules for Bluetooth. The docking ports may also incorporate multi-channel Radio Frequency (RF) and/or Near Field Communications (NFC) modules for close range wireless networking, communications, relational positioning and/or to operate as a wireless sensor hubs and/or sensor nodes in a wireless sensor network (WSN) with other networked docking ports, docking stations and UAV's. The docking ports may also operate as a wearable sensor hub networking with one or more clothing and/or body sensors, devices, gear and equipment to create a mesh network and real-time map of the person and wearable docking ports serving as docking stations for one or more UAV's.

In embodiments of the invention an Unmanned Aerial Vehicle (UAV) incorporates a universal docking port that serves as a standard physical docking, communications and power charging connector between two or more docked UAV's, between a UAV and a docking station and/or between multiple UAV's and a docking station. The docking port may also serve as a wireless power supply hub for one or more UAV's and/or one or more other docking stations within range of the docking port. The docking port may also serve as a wireless power supply hub to a wide array of mobile, wearable and other electronic devices within range of the docking port. The docking port may also serve as a wireless power supply hub for a wide array of vehicles within range of the docking port.

In embodiments of the invention the docking port may have its own battery power supply independent of the UAV or docking station. The docking port may be connected to the UAV or docking station battery power supply. The docking port may be connected directly to a power source and serve as the primary charging port for a UAV or docking station. The docking port may incorporate or be connected to a power generation system such as a solar panel, piezoelectric or other power generation system and or the docking port may be connected to a power generation system attached or incorporated into the UAV or docking station.

In embodiments of the invention the docking port may incorporate its own data processing system to process light and optical depth mapping, imaging, location, orientation and other sensor data, flight, navigation, networking, docking, launching, charging, power transfer, induction, management, distribution and/or other operational data independent of and/or in coordination with the onboard data processing module of the UAV or docking station. In other embodiments of the invention the docking port may be a fully integrated system of the UAV or docking station with or without independent processing capabilities.

In embodiments of the invention two or more Unmanned Aerial Vehicles (UAV's) with one or more docking ports may dock with each other in flight creating a connected UAV Group. A UAV Group may fly and operate as a collective and perform task as single operating unit. A UAV Group may also distribute data, power and operating functions among all or some of the docked UAV's and or assign functions to individual docked UAV's based on pre-programmed operating, flight, navigation, security and other parameters. A UAV Group may operate as a federated, hierarchical or other network configuration in which functions are distributed among all of the Grouped UAV's based on pre-assigned functions and/or based on the differing capabilities and functionality of each individual UAV in the UAV Group.

In embodiments of the invention, the UAV docking port or docking station incorporates a multi-channel wireless power transmitter and/or receiver for transmitting power to and/or receiving power from one or more remote power transmission and/or receiving UAV docking ports and/or docking stations. The docking port or docking station wireless transmitter and receiver may use any one or combination of wireless power transmission methods including but not limited to time varying electric fields, magnetic fields, radio waves, microwaves and/or infrared or visible light waves for the wireless transmission of power to and from one or more UAV docking ports and/or docking stations.

In embodiments of the invention, the docking port of the UAV incorporates an antenna to receive the wireless power transmission from a transmitting docking port and/or docking station. The UAV may also incorporate an RF to DC converter module to convert the wireless signal sent from a remote docking port, docking station, device, vehicle, UAV, aircraft tower, and/or satellite into electrical power. In embodiments of the invention the docking station and/or UAV docking port may incorporate one or more of a short range, mid-range and/or far-field power transmission system including but not limited to a non-resonant capacitive or inductive coupling system for inductive charging of docked UAV, a resonant capacitive or inductive coupling for close range wireless power transfer to one or more UAV's, docking ports and/or docking stations. In embodiments the docking station and/or UAV docking port incorporates optical receivers and antenna for receiving power from one or more high intensity light wave and/or laser beams for receiving wireless power from one or more high intensity light imaging enabled remote docking ports and/or docking stations.

a. A helmet, hard hat or other headwear as disclosed herein, includes a helmet, which may serve as a docking station comprising one or more external or covered docking ports that may be used to secure one or more UAV's. The docking port may be attached or incorporated into one or more articles of clothing, headwear and/or footwear to operate as a docking station for one or more UAV's. The docking port may be attached to and/or incorporated into a backpack and/or other gear and equipment to operate as a docking station for one or more UAV's. One or more docking ports may be attached to and/or incorporated into a car, truck, bus, motorcycle, bicycle, ATV, SUV, tank or other land vehicle. One or more docking ports may be attached to and/or incorporated into a ship, submarine or other aquatic vehicle. One or more docking ports may be attached and/or incorporated into a plane, hover craft, airship, rocket, satellite or other aerial or space vehicle to operate as a mobile docking station for one or more UAV's. A UAV may incorporate one or more docking ports for docking with a docking station. A UAV may incorporate one or more docking ports for docking with one or more other UAV's. A UAV with multiple ports may serve as a docking station for one or more other UAV's when ported with a docking station.

b. Supplemental power for said UAVs may be supplied by integrated battery(s) in or on said helmet or stored elsewhere on the wearer. In addition, said UAVs may be capable of changing shape or articulating to conform to the curvature or contours of the helmet or dock or surface proximate to said docking port for a more streamlined result. Said docking mechanisms may incorporate mechanisms for propelling the UAV into a rapid launch, such as a magnetic, electro-magnetic or electro-mechanical, catch and release mechanism, a battery, fuel propellant or CO2 gas cartridge-powered catapult or other recharging or refueling mechanism. Said UAVs may integrate arrays of various sensors including cameras, and be capable of autonomously or non-autonomously or semi-autonomously launching and/or landing on said docking stations. Docking station acquisition and targeting by said UAVs may be assisted by various means such as visible light emitters, sensors and cameras for depth mapping, imaging surrounding object and environment for docking station location, identification and positioning. Landing zone acquisition, targeting location, identification and positioning by said UAV's may be also be assisted by a visible or IR laser imaging and rangefinding system or visual markers on said docking stations or other visual detection means optionally in combination with other mechanisms such as radio transmission to and from said docking port and/or to and from said docking station. Both the UAV and the helmet may incorporate global, local and relative position tracking systems, such as GPS chips, and incorporate wide, local and personal area wireless networking capabilities such as Satellite, cellular, WiMax, WiFi, Bluetooth and optical networking using IR, laser and micro accelerometers, cameras, such that they are able to communicate to each other their absolute and relative positions. These capabilities can be used to facilitate features such as autonomous docking when a mission is complete or batteries need charging, and for returning the UAV to the docking station after flying out of direct sight of the wearer, as well as a "follow mode" in which the UAV follows a mobile docking station by maintaining line-of-sight and/or wireless communication with one or more networked docking ports and/or docking stations from a relative X, Y and Z offset as controlled by the user or pre-set selections or other algorithms that take into account factors such as obstacles and other objectives such as surveillance for nearby hazards. In addition, charging of said UAVs may be aided by portable solar panels or piezoelectric generators on the user or integrated into said helmet, clothing, gear and equipment, vehicles and other mobile or stationary docking stations.

c. The disclosed invention may include UAV flight and operational control mechanisms integrated into said helmet or facemask or eyewear. Such mechanisms may include feedback mechanisms wherein video and audio and night-vision footage from a personal UAV can be streamed live to microphones in the wearer's helmet and to a digital display or heads-up display, augmented-reality or virtual-reality display projection system integrated into the user's eyewear. The user can optionally control said UAVs by any combination of such means as voice control, head movement, eye movement, hand movement, body movement, foot movement, and/or hand-held or hand-operated controllers, as well as smart phones and smart wristbands. The helmet or headgear may optionally incorporate cameras and other sensors that may be used in concert with data from said UAVs to coordinate UAV activity. Live data and video feeds from the UAV may be projected into the helmet wearer's display to provide first-person viewer control over the UAV, as well as optional surround video footage. The user can optionally instruct the UAV to face and or fly in whichever direction the helmet wearer is focused, or its control can be selected to be autonomous or controlled via alternative means such as voice command or a hand-held controller, thereby enabling the helmet wearer to turn his head in any direction to view video footage from cameras facing that direction, without influencing the UAV's orientation or flight path.

d. As depicted, said personal UAVs may also include projectiles and lethal or non-lethal weapons systems, such as small anti-personnel devices. According to one embodiment, such systems may include $CO_2$ propelled anti-personnel projectiles, explosive darts for combat situations, electrical stun-darts for neutralization of criminals or combatants, tear gas canisters, smoke or stun grenades, or drug-dosing darts such as may be useful for game wardens. Some UAV functions may optionally also be available to the user while the UAV is docked on the headgear or other structure that supports a docking station, including but not limited to, camera feeds, and any integrated weaponry, according to some embodiments. As depicted, according to some embodiments, a UAV may incorporate forward-facing projectile launchers, as well as cameras and night-vision systems, as well as other sensors for functions such as weapons targeting, maneuvering, medical or emergency response services, and/or other UAV services and/or robotic capabilities etc. In the depicted embodiment, in addition to providing these functions during flight, said camera, sensors and projectile launchers may optionally also be functional while the UAV is docked on the user's helmet or other docking platform, as well as when in the air or when parked or moving on a surface.

e. According to some embodiments, the portable UAVs may be capable of changing their shape or articulating their propulsion arms to alter the attitude of propulsion mechanisms to enable said UAVs to land on various surfaces, including personal docking stations and other surfaces. In the example depicted, the UAV has four rotors in a quadcopter configuration, but may have as few as one or many more, such as in an octocopter configuration, or other propulsion mechanisms. The depicted rotors have protective rings around them, making it possible for the UAV to land on any surface by tilting said protective rings such that their outer edges make contact with the surface below. Floats may be integrated to make it possible for the UAV to land on water (not depicted). The UAV may also incorporate hubbed or hubless wheels to enable it to drive on surfaces, thereby saving energy or for stealth operations. In one depicted embodiment, the UAV makes use of hubless wheels which are configured around the protective rings that encompass the rotor blades. The depicted UAV is able to dynamically twist or articulate the wheels to be in alignment for optimal ambulation over terrain and for turning. The exterior surface of the UAV's arms can be jointed or be composed of flexible materials, as depicted. The arms can employ any articulation mechanism such as are commonly employed in robotic devices, including but not limited to, servos, cables that are pulled by tensioning mechanisms, or wound around one or more coiling mechanisms and potentially counteracted by springs, hydraulics, as well as nano-muscle type means that employ electric impulses to contract and relax mechanisms that mimic muscle function, as well as other common joint articulation control mechanisms.

A method of docking a UAV onto a wearer is also disclosed. The method comprising providing a docking station with target acquisition guides (which may optionally comprise any combination of visual markers, LED lights, infra-red LEDs, ultra-sonic emitters or radio emitters, lasers and sensors that compliment such emitters, as well as general position tracking technologies such as GPS location, such that the UAV is able to autonomously acquire the docking port of a docking station and dock with said docking station. Continuous feedback to the wearer of a docking port may include any combination of audio, visual or haptic-feedback such as vibrations at different locations on the user, so that the wearer of the docking port may be automatically cued and directed to temporarily move or pause movement or orient his or her body, head or feet, such as leaning forward in order to make it possible or easier for the UAV to dock on said docking port.

Also disclosed are footwear such as a shoe or boot, that have integrated or attachable UAV docking port, as well as UAVs capable of docking onto said footwear and approximately conforming to the general external shape of said footwear or of a foot in order to maintain a low profile while docked and to eliminate risk of tripping or snagging said UAVs on other objects while walking or running. In addition to providing a docking port for flying UAVs, said footwear-mounted docking ports can also harbor rolling UAVs (such as remote-controlled vehicles), or UAVs capable of both rolling on a surface and flying.

Also disclosed are outerwear including but not limited to ballistic protection vests, hunting vests, jackets, shirts and pants which have integrated or attachable UAV docking ports with optional data links and UAV charging capabilities such as auxiliary batteries. Said docking port may be integrated into the outerwear and may be capable of supporting multiple UAVs concurrently. Also disclosed are jackets or outerwear with shoulder or lapel-mounted docking ports, and "epaulette" UAVs capable of landing on and launching from said shoulder-mounted docking ports, and of optionally conforming to the general shape of the shoulder for optimal comfort and a low profile. Also disclosed are backpacks, and other personal packs and bags including but not limited to waist packs that can incorporate a UAV docking port, as well as UAVs capable of docking onto said pack-mounted docking port, or even onto backpacks and personal packs and bags without docking ports, in which case the UAVs would have gripping mechanisms capable of grabbing on and holding onto said backpacks, packs and bags or other surfaces, such as helmets or footwear. Also disclosed are compact multi-functional docking ports that can be attached to a variety of items and surfaces, such as a shirt or jacket pocket, or a shoe upper surface by various means such as but not limited to clips, magnets, snaps, ties, cords, hook and loop material, etc. Also disclosed are methods in which personal UAV docking ports incorporate one or more cameras able to stream live video and sensor footage to multiple users on the ground and operations coordinators in remote locations, so that said users can individually obtain optimal battlefield awareness of their positions relative to each other and to enemy combatants. Control of said UAVs may be traded between friendly combatants or coordinated by one individual or by a "master control UAV". UAVs may also operate autonomously, semi-autonomously or under full control of a human operator.

Also disclosed are the ability of a UAV Group to form temporary or ad-hoc communications networks, enabling ground-based individuals or mechanisms to communicate more easily with each other via any of various communications means such as radio waves, mobile phone communications, or even lasers for secure, direct communications. Also disclosed are mother-ship UAVs with multiple docking ports capable of supporting and refueling or recharging multiple smaller UAVs while in the air, or on the ground or in water.

For the sake of simplicity, the UAVs depicted in the figures are all quadcopters, but these may take any number of differing forms, with more or fewer rotors or use any other kind of viable propulsion system that may be available at present or developed in the future.

Other aspects and advantages of embodiments of the disclosure will become apparent from the following descriptions, taken in conjunction with the accompanying drawings, illustrated by way of example of the principles of the disclosure.

FIG. 1A illustrates a perspective view of a helmet and UAV guidance system with a docking port for a compact personal UAV, as well as a UAV configured to be able to launch from said helmet and land on said helmet, in accordance with an embodiment of the present disclosure. Depicted is a military helmet, but the headwear may take a variety of other forms, including various sport and safety helmets, as well as other headwear such as hats.

Figure 1B:
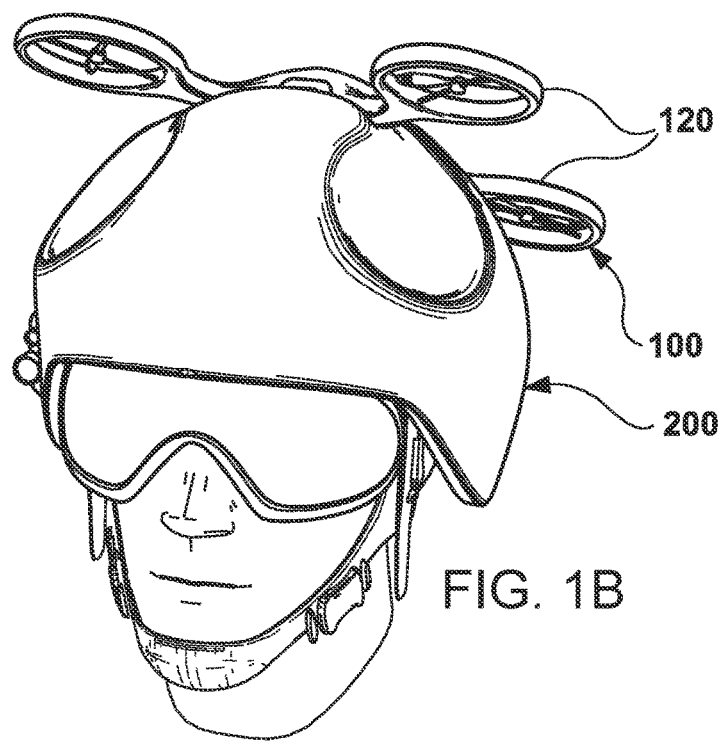
FIG. 1B depicts said helmet with a UAV attached and in its extended flight pose as it either prepares to launch or has landed and is in the process of docking.
Figure 2A:
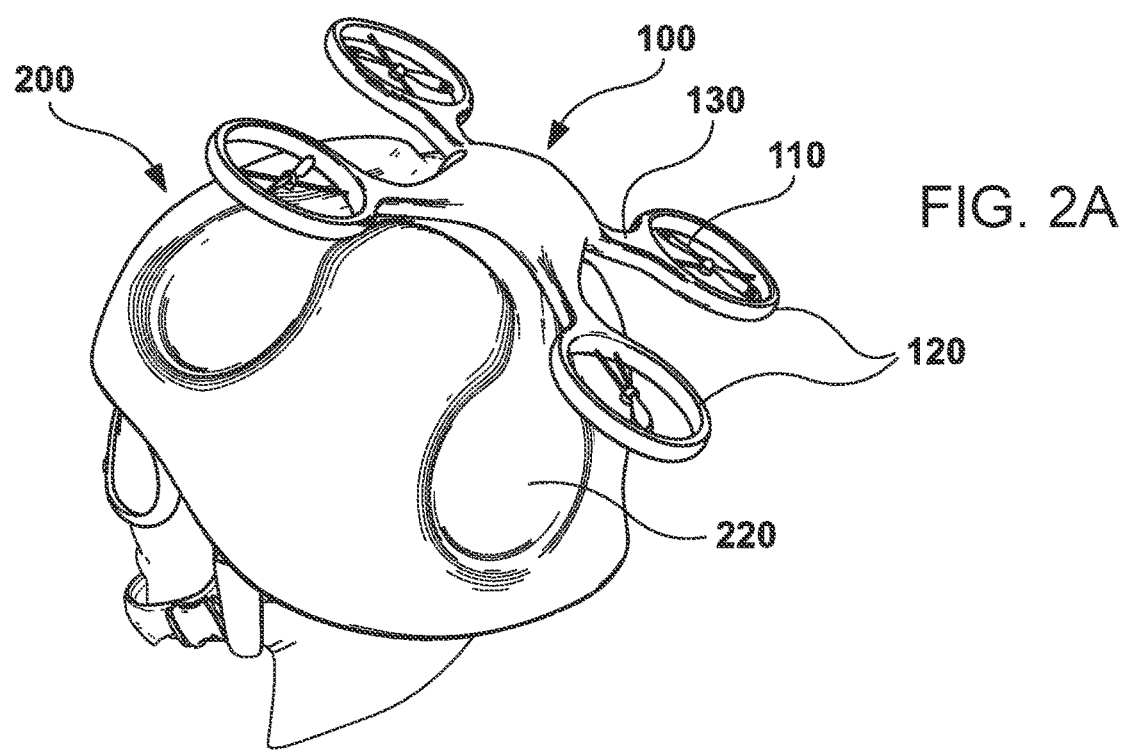
FIG. 2A depicts said helmet with a UAV attached as it either prepares to launch or is landing and is in the process of docking.

FIGS. 1B and 2A depict perspective views of the helmet with the UAV attached and in its extended flight pose as it either prepares to launch or has just landed and is in the process of docking, in accordance with an embodiment of the present disclosure.

Figure 1C:
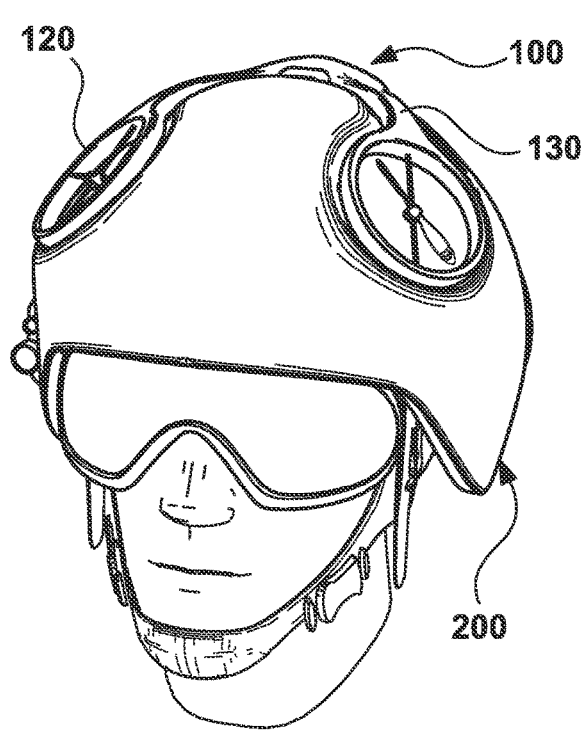
FIG. 1C depicts said helmet with a UAV docked and conformed to the shape of the docking area and general curvature of said helmet.
Figure 3A:
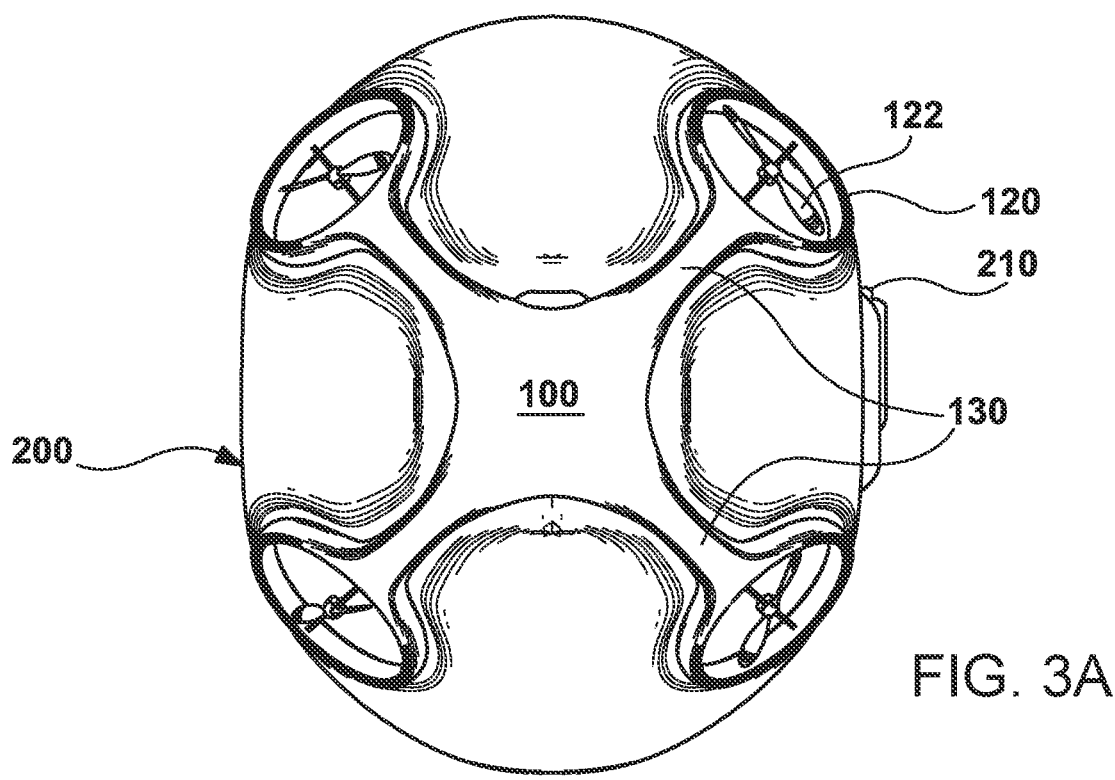
FIGS. 3A & 3B depict said helmet with a UAV docked and conformed to the shape of the docking area and general curvature of said helmet.
Figure 3B:
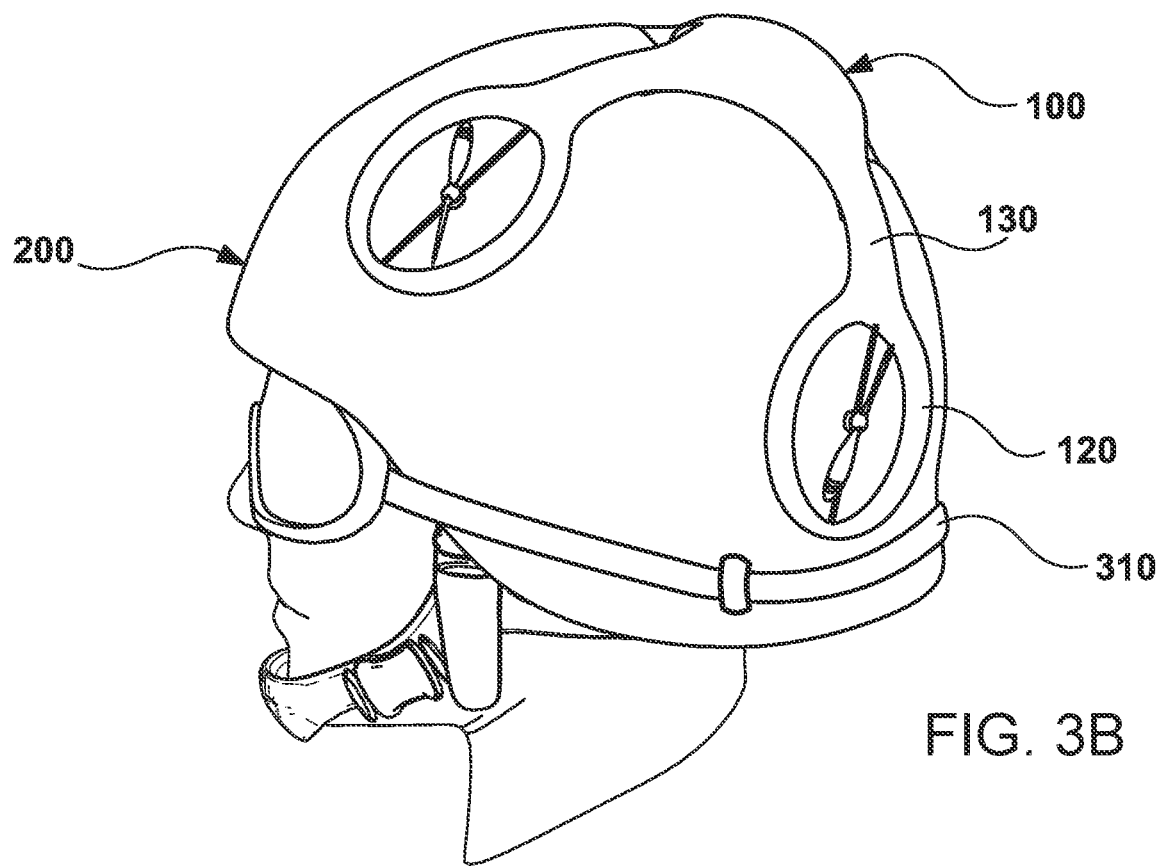

FIGS. 1C, 3A and 3B depict perspective views of the helmet with the UAV fully docked and wrapped onto the helmet with its shape conformed to the shape of the docking area and general curvature of said helmet. Said UAV may be secured to said helmet by various means, including passive friction grips and active locking mechanisms which may be engaged and disengaged autonomously by the UAV or dock, or upon command by the user, in accordance with an embodiment of the present disclosure.

Figure 1D:
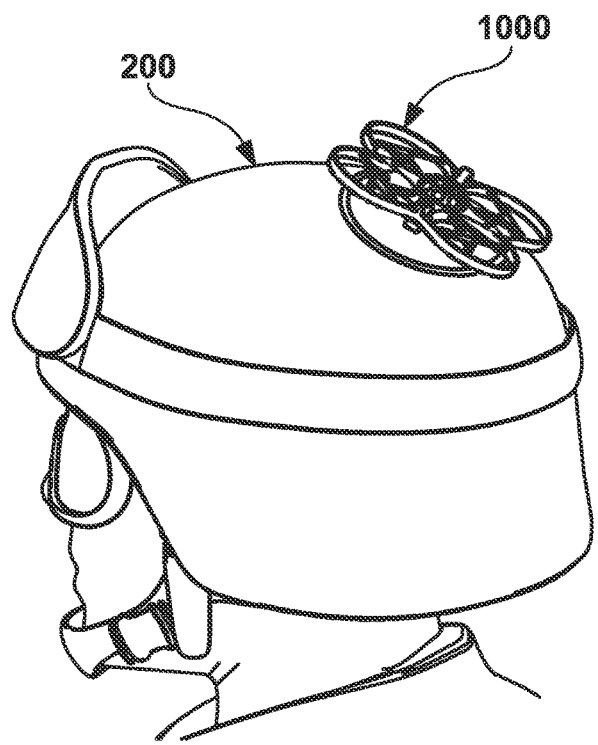
FIG. 1D depicts said helmet with an optionally detachable docking port and a docked compact UAV that does not change its form to conform to the shape of the docking area.

FIG. 1D depicts helmet with a docking port and a docked compact UAV that does not change its form or articulate its arms to conform to the shape of a docking surface. UAV docking ports can optionally be attached or affixed to any existing helmet or headwear or other gear or object, to enhance such items with UAV docking capabilities.

Figure 2B:
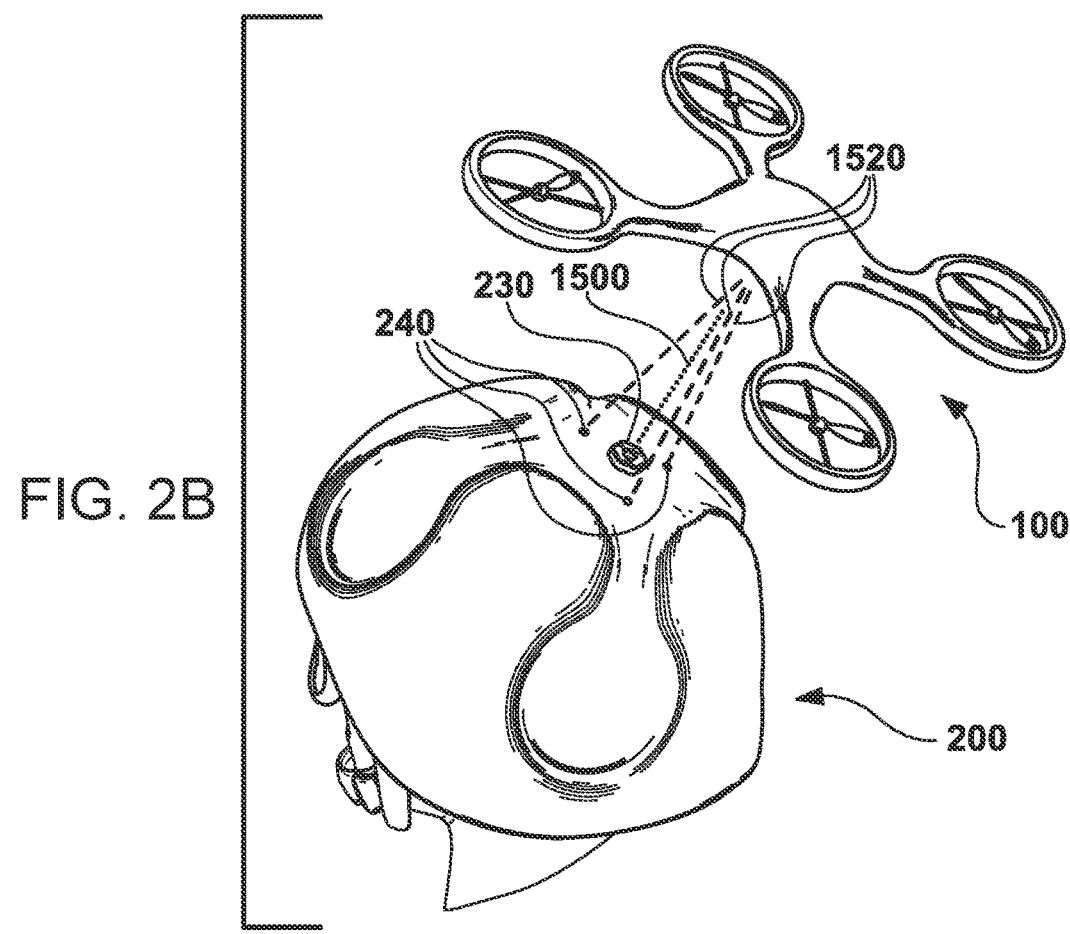
FIG. 2B depicts said helmet with a UAV hovering above the helmet and tracking the docking port, either just after take-off or just prior to docking on said helmet.

FIG. 2B depicts a rear perspective view of the helmet with the UAV hovering above the helmet, either just after take-off or just prior to docking on said helmet, in accordance with an embodiment of the present disclosure. Said UAV is able to track, follow and autonomously land on said helmet dock.

FIG. 4A depicts an armed compact personal UAV with a camera and double-barreled projectile launcher, in accordance with an embodiment of the present disclosure. The launcher may fire lethal or non-lethal weapon systems, such as small anti-personnel devices. According to one embodiment, such systems may include $CO_2$ propelled anti-personnel projectiles, explosive darts for combat situations, electrical stun-darts, paint or DNA markers for neutralization or identification of criminals or combatants, tear gas canisters, smoke grenades, stun grenades, or compact GPS tracking devices (such as a tracking and transmitting device magnetically attached to a vehicle), or devices that use electrical, mechanical or electromagnetic pulse mechanisms for disabling a target vehicle or its inhabitants, or drug-dosing darts such as may be useful for game wardens.

FIG. 4B-C illustrate perspective views of the armed UAV docked onto the user's helmet, in accordance with an embodiment of the present disclosure. Cameras, sensors and projectile launchers may be configured to be able to function while on the helmet or when resting on a surface. The helmet-wearer is able to control the UAV functions and view camera and sensor feeds in a digital display. Such digital display may be built into eyewear, face mask, contact lenses, etc. or be a projected heads-up display. The user may be able to aim and fire projectiles from the UAV while it is docked, landed on a surface, or while it is in the air.

Figure 5:
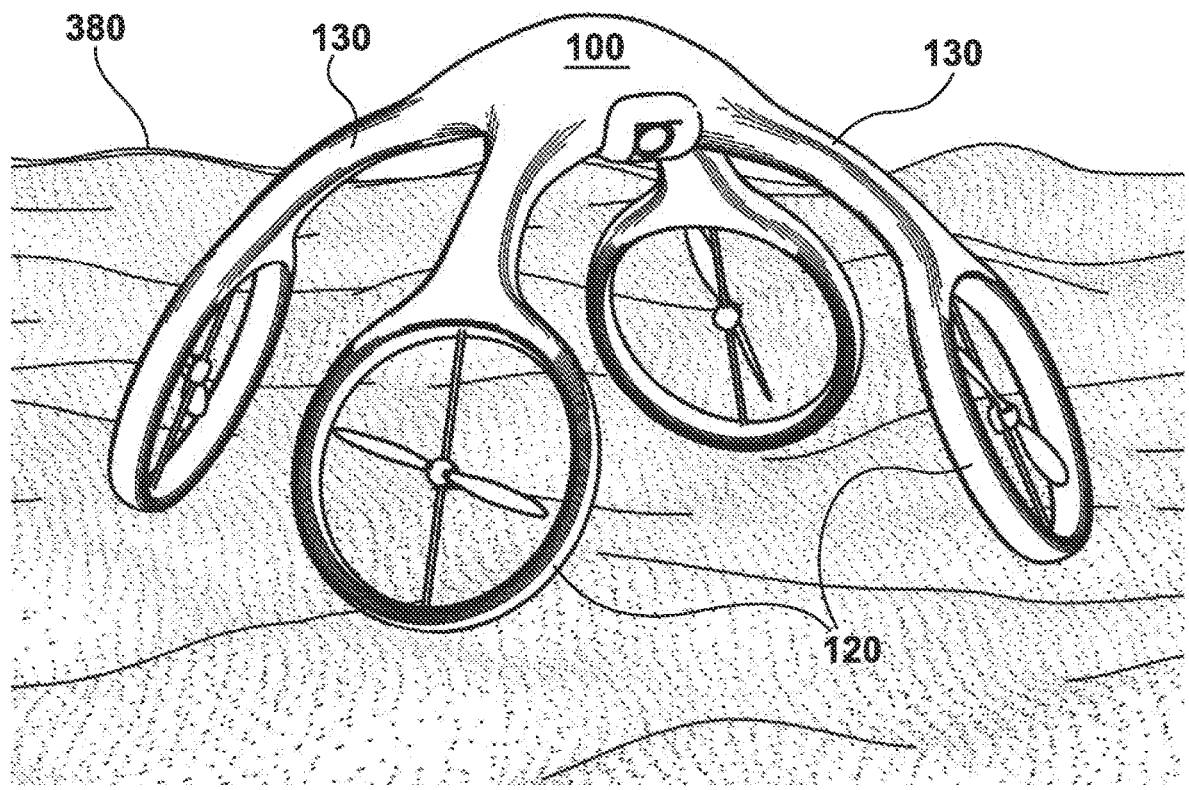
FIG. 5 depicts a UAV that can articulate its shape such that it can land on terrain or surface other than a docking station.

FIG. 5 illustrates a perspective view of a personal UAV which has landed on terrain or surface other than a docking station, in accordance with an embodiment of the present disclosure. In the depicted embodiment, the rotor blades remain protected because the UAV arms are able to articulate such that the edges of the protective rings around the rotor blades can act as feet or wheels.

Figure 6:
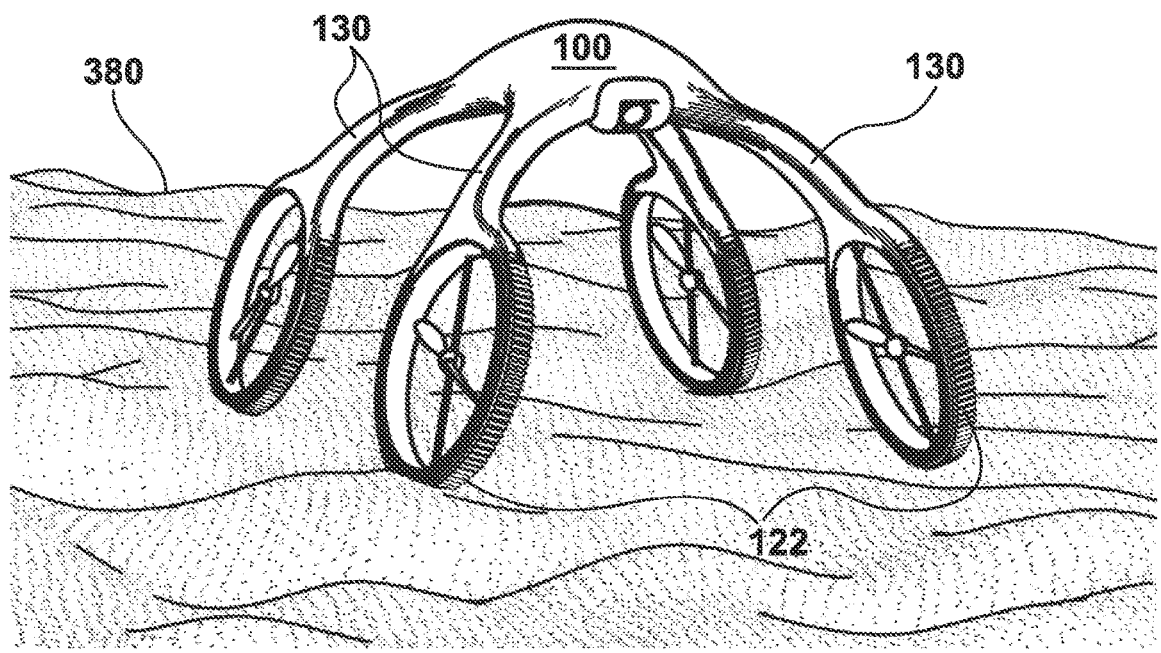
FIG. 6 depicts a UAV that incorporates wheels in the protective rings around its rotors which, when landing can articulate into a position such that the UAV is capable of traversing over terrain on said wheels.

FIG. 6 illustrates a perspective view of a personal UAV which has landed on terrain or surface other than a docking station, and in which the protective rings incorporate wheels, in accordance with an embodiment of the present disclosure. The depicted UAV is capable of traversing over terrain on wheels, as well as flying and landing.

Figure 7A:
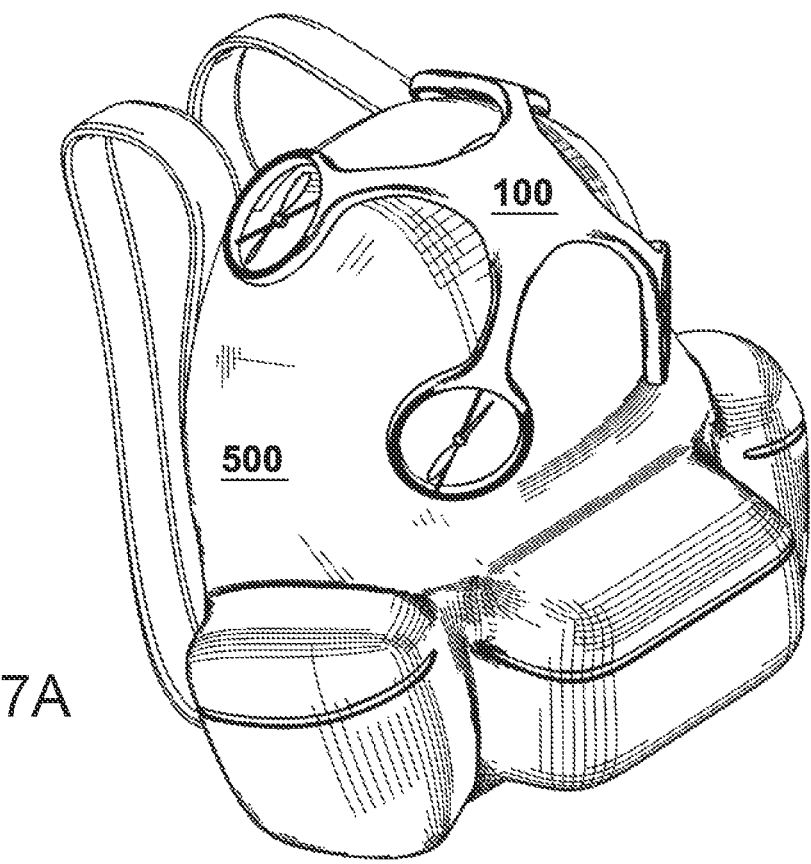
FIG. 7A depicts a backpack-mounted UAV and backpack with optionally integrated or attachable docking port that can attach and conform to a variety of clothing, gear and objects.

FIG. 7A illustrates a perspective view of a backpack-mounted UAV, in accordance with an embodiment of the present disclosure. Said UAV may be capable of launching from said backpack and landing on said backpack. Said backpack may optionally incorporate an integrated docking port and UAV fasteners or fastening system, with UAV charging and/or refueling from an internal or integrated or attached power supply or fuel supply as well as data connectivity capabilities between the UAV and computerized control mechanisms in or on the backpack or on the user's person. Alternatively, such functions may be provided by a non-integrated attachable backpack docking port that can attach to a variety of different generic backpacks or other gear or objects.

Figure 7B:
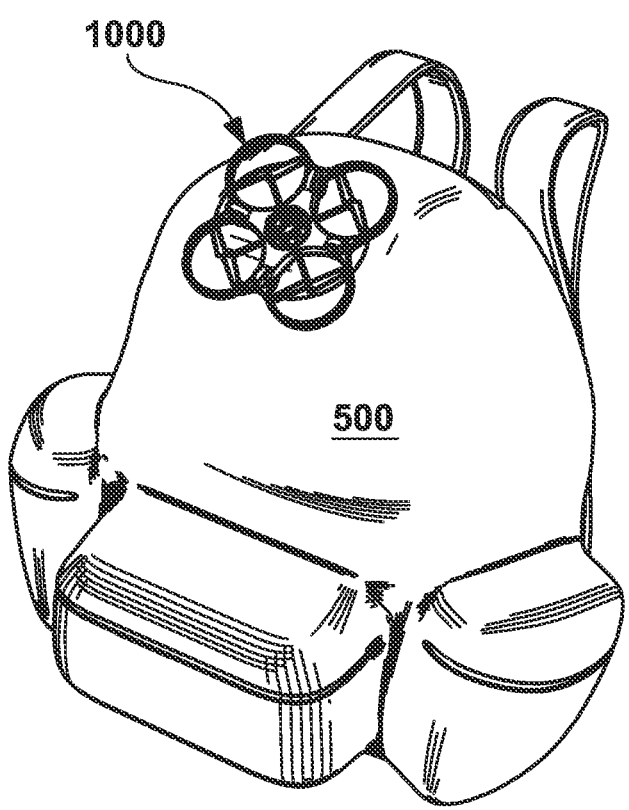
FIG. 7B depicts a backpack with a UAV docking port and docked UAV that does not change its shape or form to adapt to the shape of the underlying docking surface.

FIG. 7B depicts a backpack with a UAV docking port and a compact UAV that does not change its shape or form to adapt to the shape of the underlying docking surface. UAV docking ports can be affixed to any existing backpack or gear or object to provide UAV docking capabilities.

Figure 8:
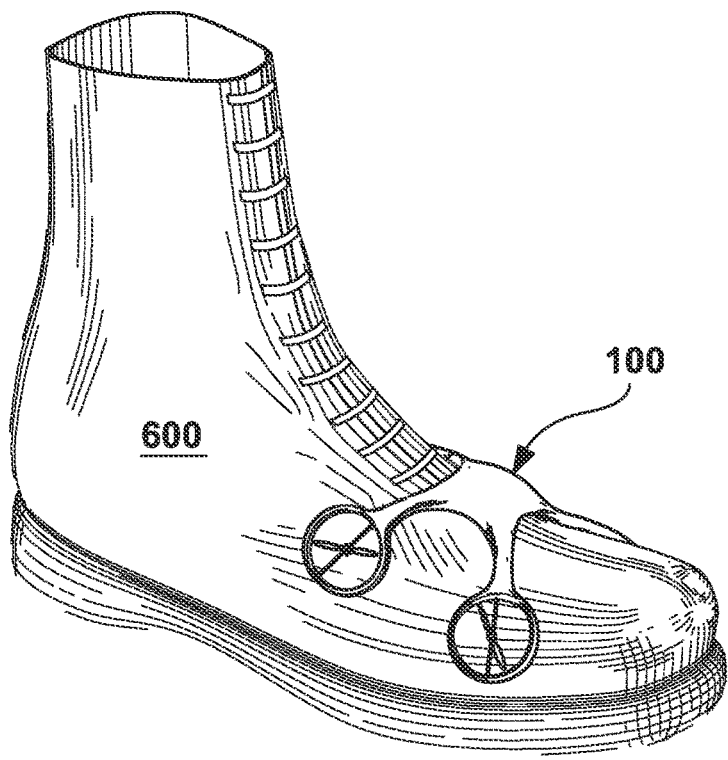
FIG. 8 depicts a boot or shoe, and boot or shoe-mounted UAV.

FIG. 8 illustrates a perspective view of a boot and boot-mounted UAV in accordance with an embodiment of the present disclosure. The boot may have an integrated docking port or the docking port could be an attachable device that can work with boots and shoes of various sizes and shapes.

Figure 9A:
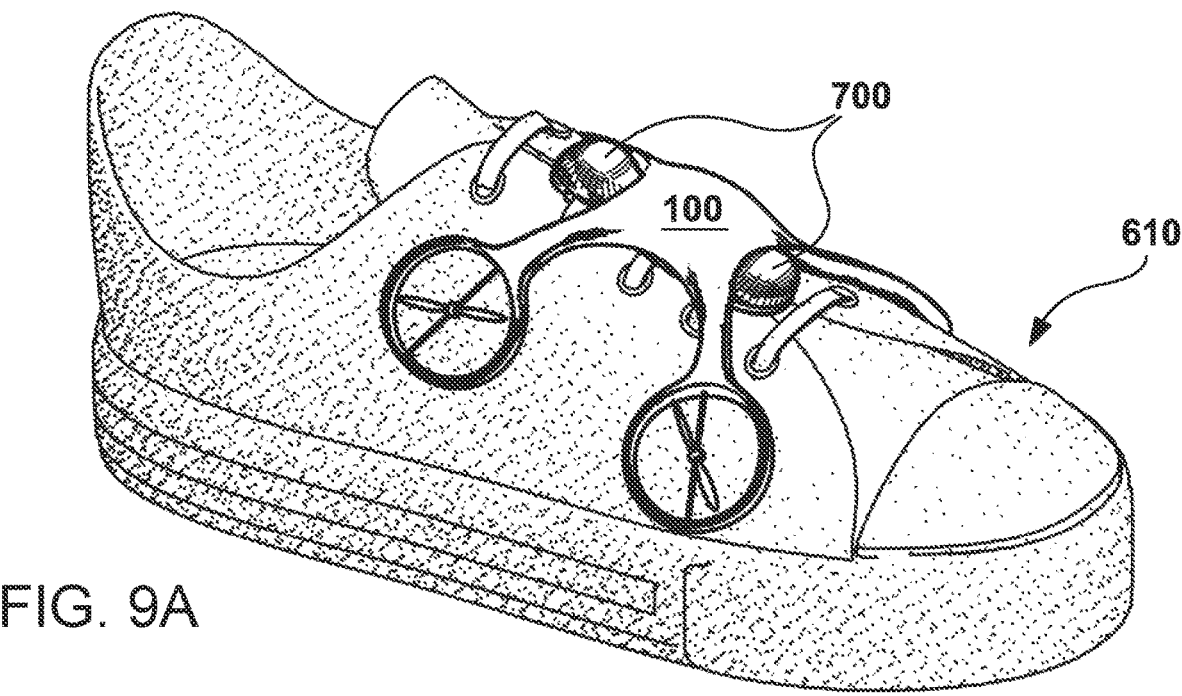
FIG. 9A depicts an optionally attachable or integrated footwear-mounted UAV docking port with UAV and shows the UAV docked and secured to the footwear.
Figure 9B:
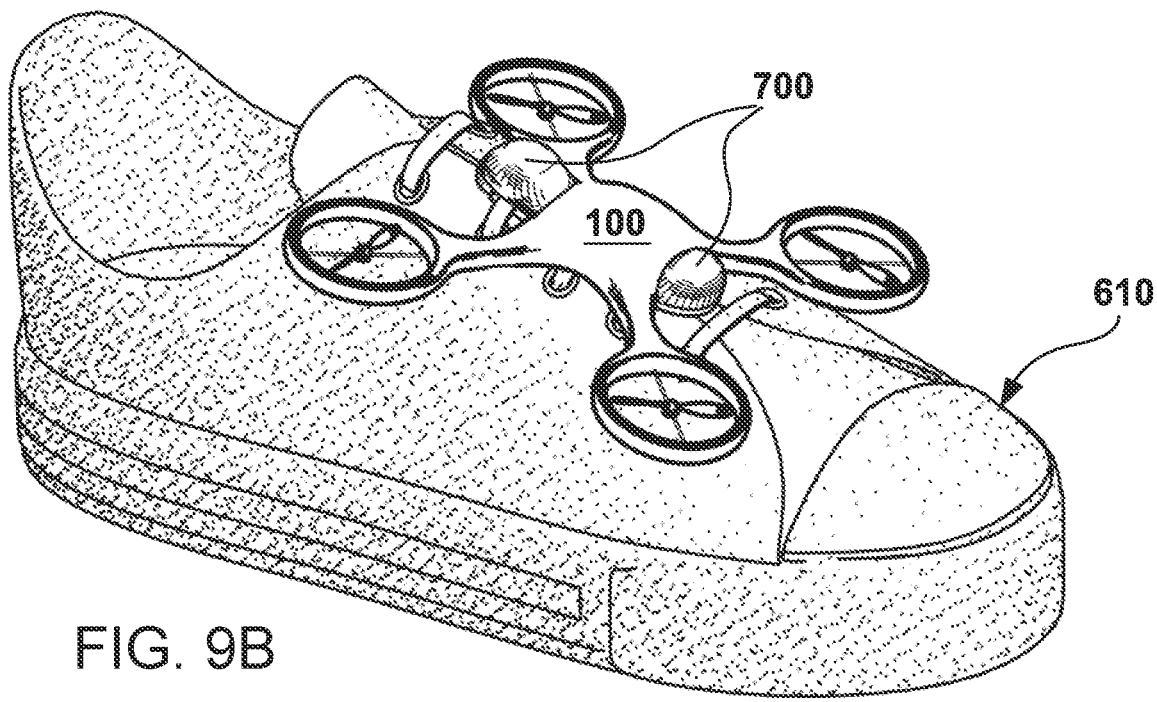
FIG. 9B depicts an optionally attachable or integrated footwear-mounted UAV docking port with UAV and shows the UAV extended into flight position as it prepares for take-off or as it lands.
Figure 9C:
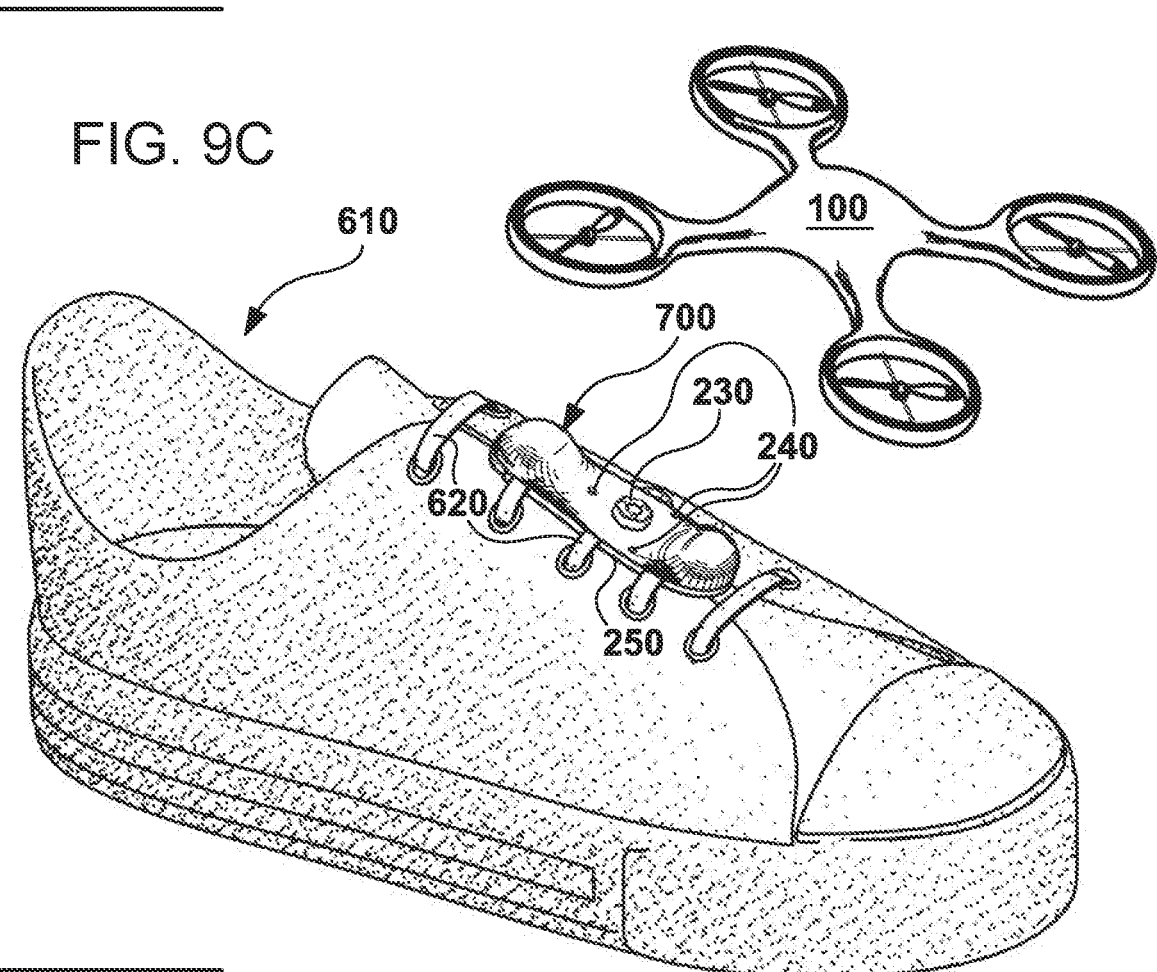
FIG. 9C depicts an optionally attachable or integrated footwear-mounted UAV docking port with UAV and shows the UAV hovering above the footwear, having launched or preparing to land.
Figure 10:
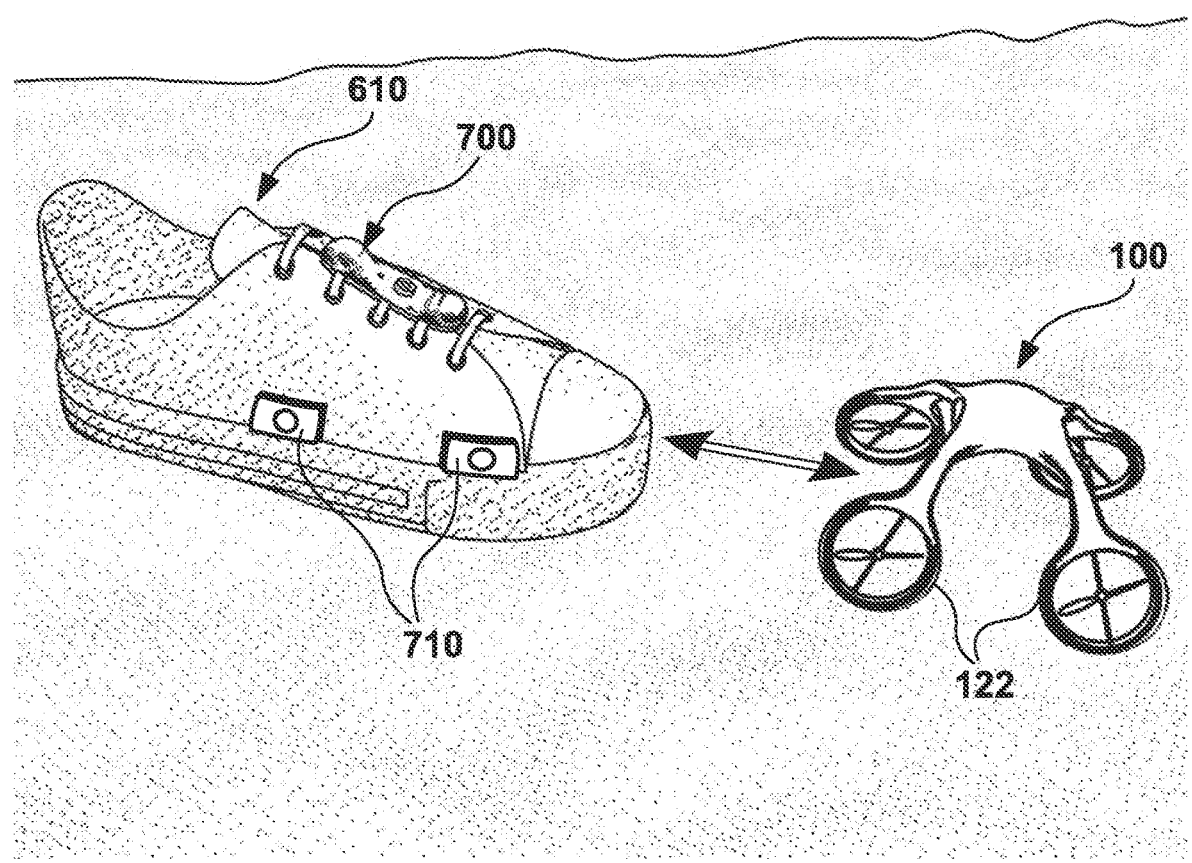
FIG. 10 depicts a UAV—remote-controlled wheeled vehicle that can drive over terrain and dock with a shoe, a boot or other object.

FIG. 9A-C illustrates perspectives view of an attachable footwear-mounted UAV docking port with docked UAV, in accordance with an embodiment of the present disclosure. FIG. 9A shows the UAV docked and secured to the footwear with the UAV having conformed its shape to the footwear. FIG. 9B shows the UAV with arms extended into flight position as it prepares for take-off or as it lands. FIG. 9C shows the UAV hovering above the footwear, having launched or preparing to land. The attachable docking port is visible in the depiction but may be concealed and may take any form. In the depicted version, the docking port makes use of a clip that allows it to be secured to the laces of the footwear, according to some embodiments. According to other embodiments, the UAV docking port may be integrated into the footwear FIG. 10 illustrates a perspective view a UAV or remote-controlled vehicle that can drive over terrain and dock with a shoe or boot, in accordance with an embodiment of the present disclosure. The depicted UAV is capable of both flying and rolling on the ground, in accordance with an embodiment of the present disclosure, but may alternatively be capable of just one of these two modes of transport. The footwear may incorporate any combination of auxiliary batteries, solar panels and piezo-electric generators that generate power from walking or running, in accordance with an embodiment of the present disclosure.

Figure 11:
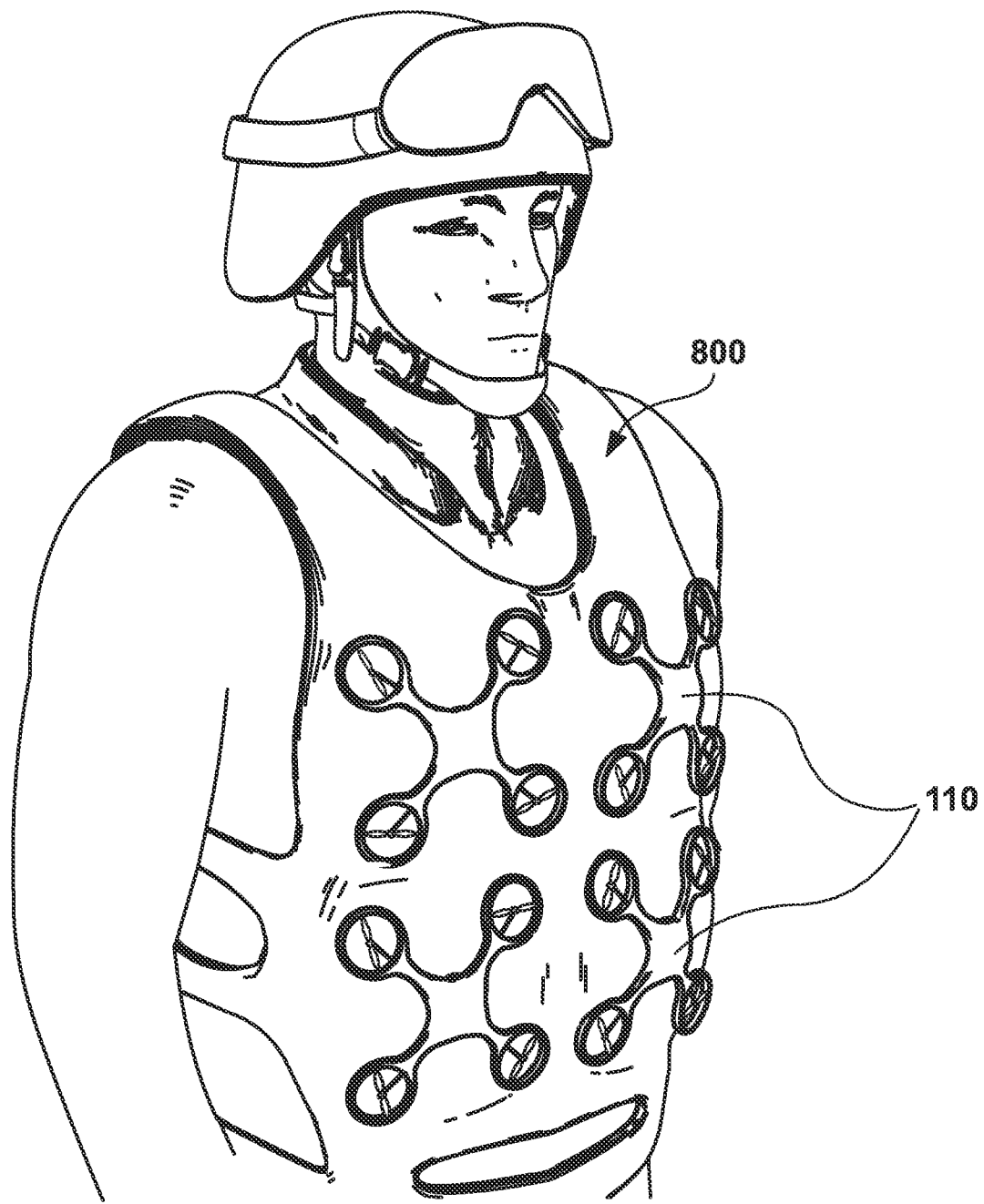
FIG. 11 depicts a vest, clothing or outerwear with integrated docking ports for one or more UAVs.

FIG. 11 illustrates a perspective view of a military or law enforcement ballistic protection vest with integrated docking ports for one or more UAVs, in accordance with an embodiment of the present disclosure. UAVs may be launched and docked autonomously.

Figure 12:
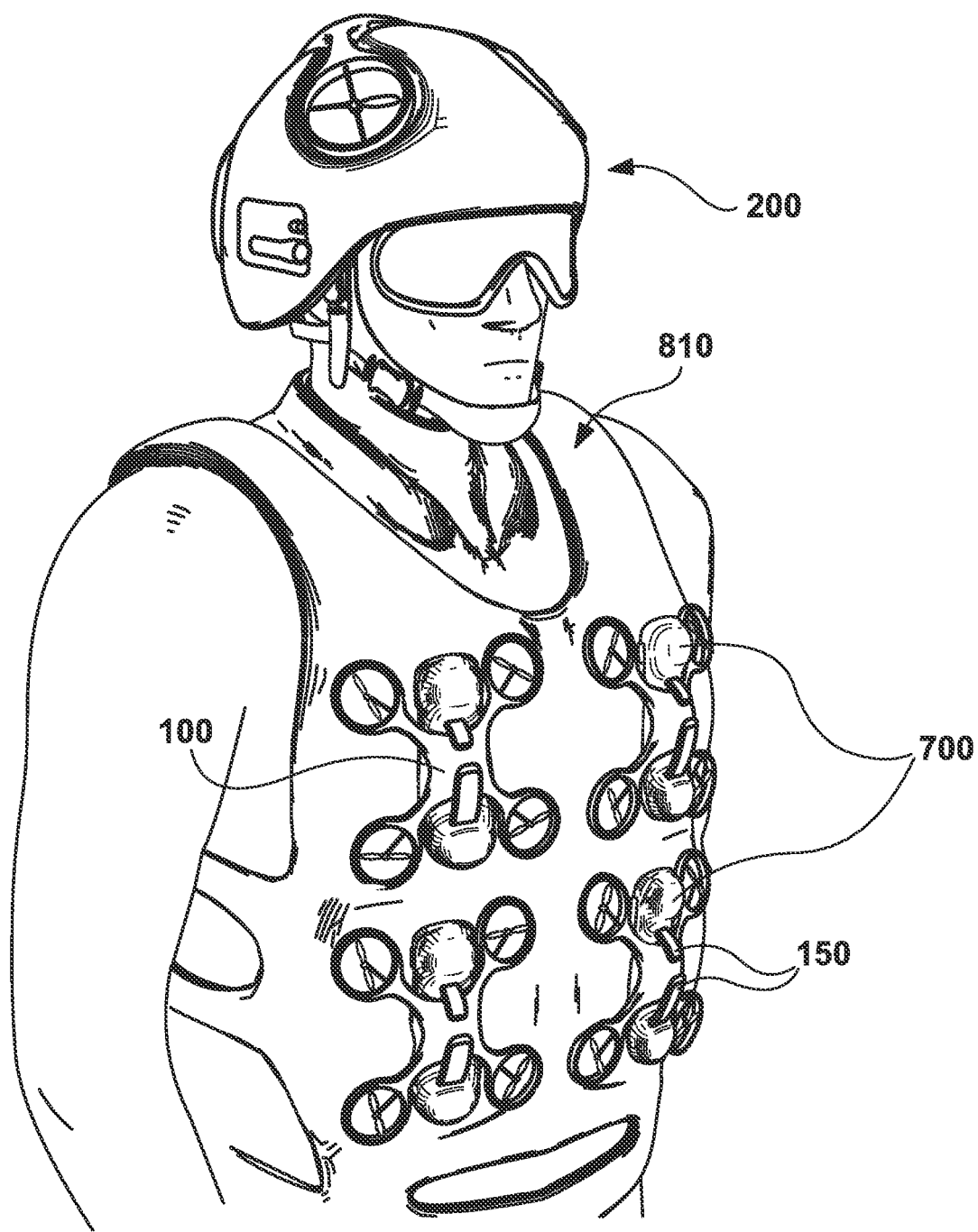
FIG. 12 depicts a vest, clothing or outerwear with modular attachable docking ports and UAV securing mechanisms for one or more UAVs.

FIG. 12 illustrates a perspective view of a military or law enforcement ballistic protection vest with modular attachable docking ports for one or more UAVs, in accordance with an embodiment of the present disclosure. In the depicted embodiment, said docking ports have additional locking mechanisms or grips for securing the UAVs. The user is also wearing a helmet with its own helmet-docked UAV, and with integrated UAV feedback and control systems.

Figure 13A:
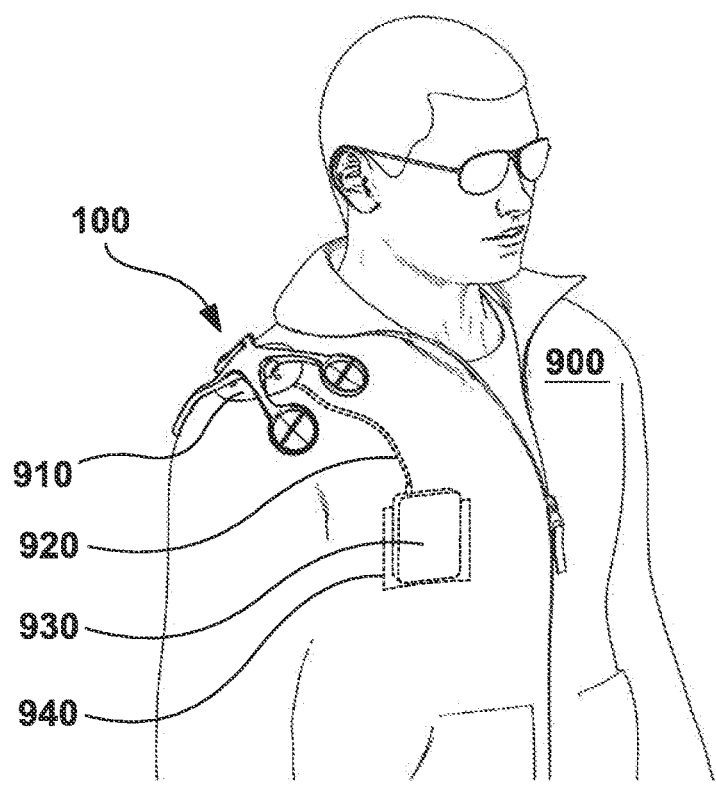
Figure 13B:
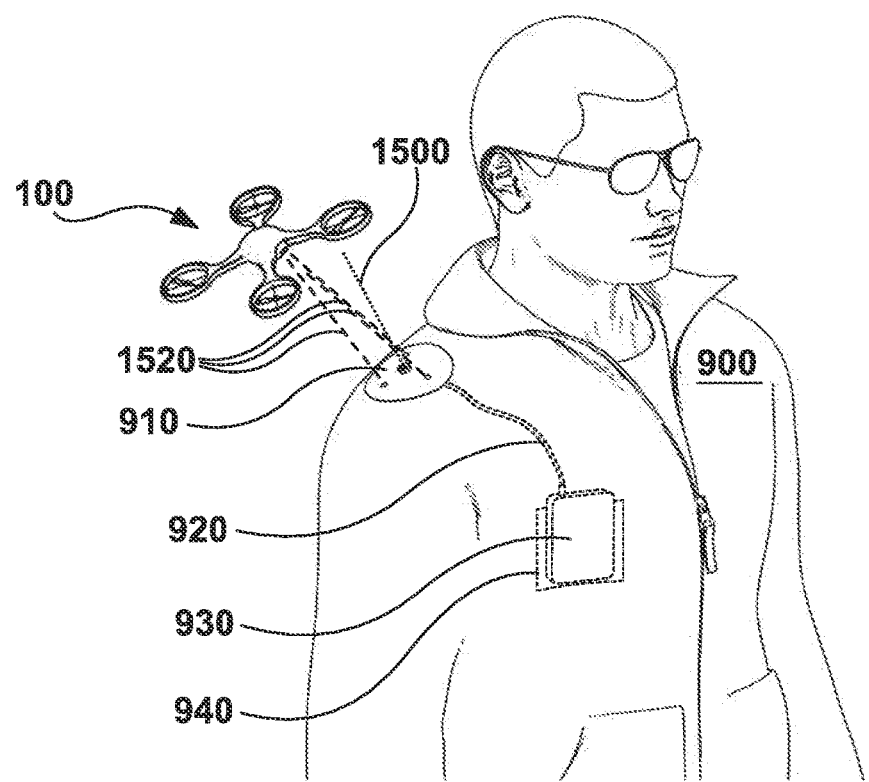

FIGS. 13A-B illustrate perspective views of outerwear such as a jacket, coat, shirt or vest in with an integrated UAV docking port positioned approximately on the wearer's shoulder, in accordance with an embodiment of the present disclosure. Said outerwear can provide charging and data connectivity capabilities with internal wiring and pockets to hold an auxiliary battery and/or a solar or piezo-electric generator that generates power from the wearer's movement. Said UAV may be able to autonomously or semi-autonomously launch from said docking port and land on said docking port. Said UAV and the UAVs depicted in the other figures may be controllable via any remote control device, including but not limited to a smart-phone, smart-watch, smart wrist band, hand-held flight controller, smart eye-wear, heads-up, augmented reality and virtual reality displays, body-motion, head-motion and/or eye-motion and/or facial expression tracking devices, voice-recognition or brain-pattern recognition devices.

Figure 14:
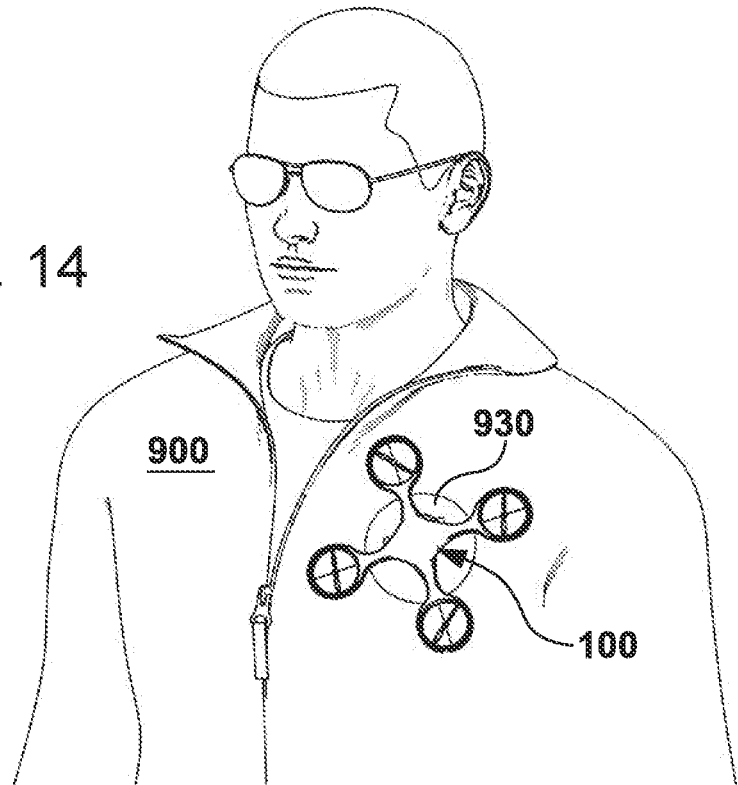
FIG. 14 depicts clothing or outerwear with an integrated UAV docking port.

FIG. 14 illustrates a perspective view of outerwear such as a jacket, coat, shirt or vest in with an integrated UAV docking port positioned approximately on the wearer's chest, in accordance with an embodiment of the present disclosure. Said docking port may optionally provide charging and data connectivity features as discussed in the two previous figures.

Figure 15:
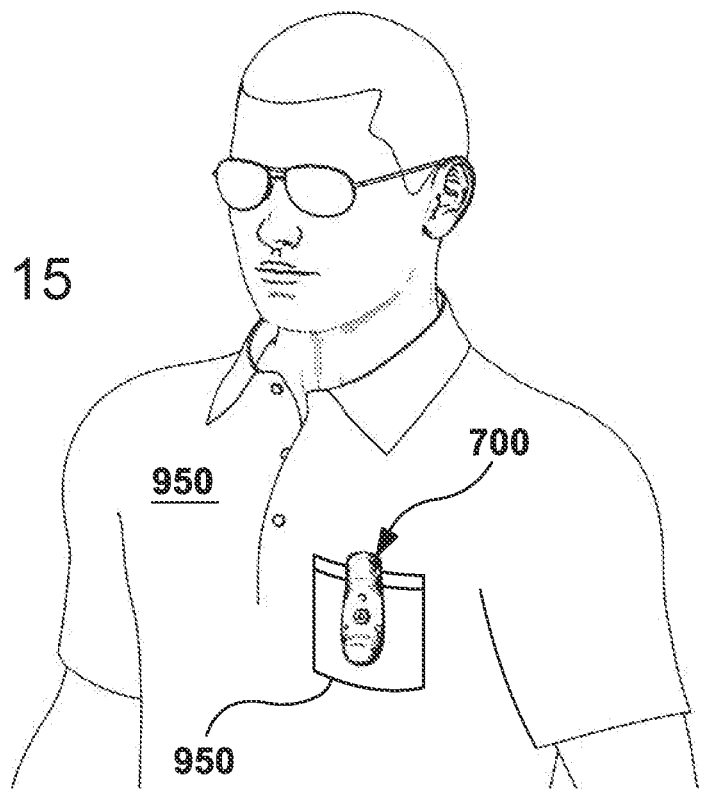
FIG. 15 depicts clothing or outerwear with an attachable UAV docking port.
Figure 16A:
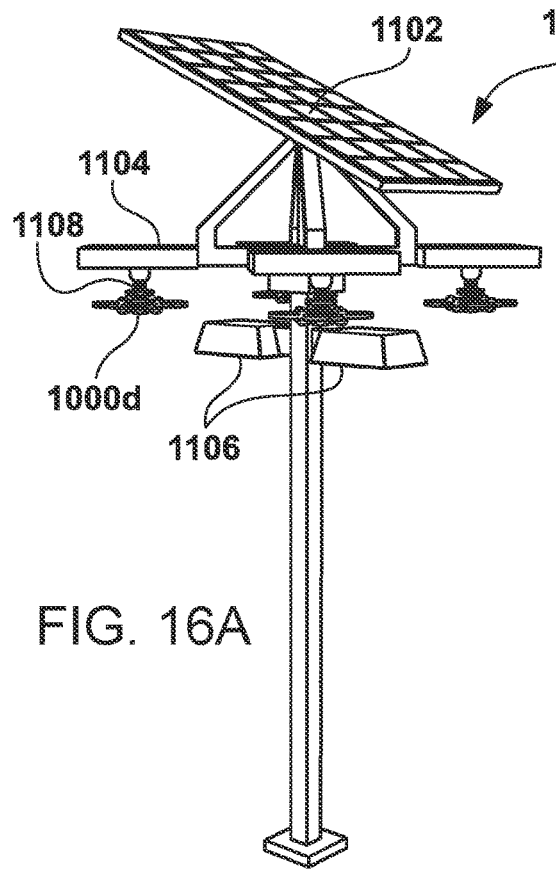
FIG. 16A depicts UAV a docking station capable of docking, networking and charging or refueling multiple UAVs concurrently, and shows the UAV docking station with multiple UAVs docked and with optional renewable energy or solar power generation panels and street lamps.
Figure 16B:
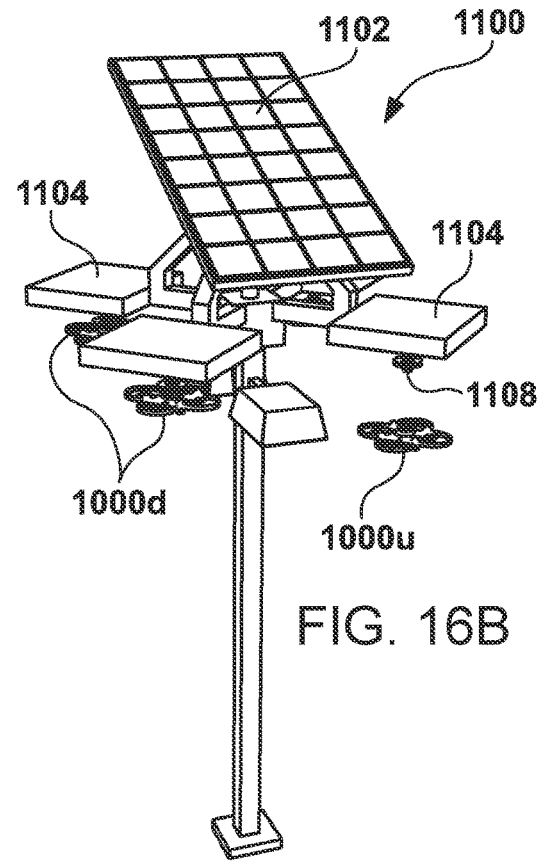
FIGS. 16B & 16C depict UAV docking stations capable of docking, networking and charging or refueling multiple UAVs concurrently and show the UAV docking stations with an undocked UAV departing or approaching a docking port.
Figure 16C:
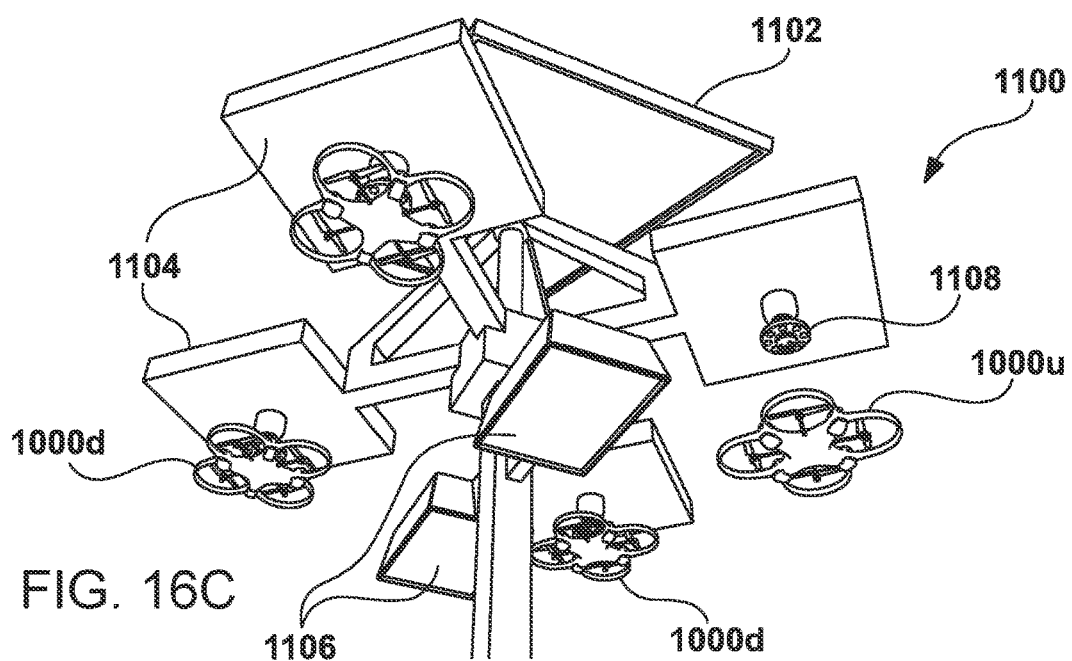

FIG. 15 illustrates a perspective view of outerwear such as a shirt, with an attachable UAV docking port clipped onto the pocket, in accordance with an embodiment of the present disclosure.

FIGS. 16A-C, and 17A-C depict UAV docking stations capable of docking and charging or refueling multiple UAVs concurrently. Said docking stations may be connected to the power grid and communications networks and/or may optionally generate power for charging UAVs and powering communications from renewable sources such as solar, wind or wave energy. Docking stations may provide shelter and protection for UAVs from weather and other threats. Docking stations may be mounted on poles such as street lamp posts (as depicted here), telecommunications poles and towers, power pylons, and may be positioned at street level, on building rooftops or building sides or inside buildings or underground facilities, or on vessels such as ships, vehicles, airships, aircraft, mothership, UAVs, or anywhere else.

UAVs may perform useful functions while docked. For example, depicted UAVs may spend most of their time operating as pole-mounted security cameras, and only undock and fly when instructed to pursue or follow a moving target. Targets may be tracked by a variety of markers, such as visual recognition, pattern recognition, infra-red or ultra-violet signature, biometric characteristics (walk gait characteristics, face/iris recognition, etc.), or tags attached to the target such as tracking transmitters, RFID tags, dye or DNA-infused spray (such as used by some security devices to tag an intruder or thief), radioactive dot or RFID chip on target, etc. Docking ports may incorporate moving parts for locking onto UAVs or alternatively, said moving parts may be integrated into the UAVs. The latter configuration would enable the UAVs to dock and undock autonomously without relying on action or permission from the docking station, and simplifies construction of docking stations without moving parts, thereby making them more durable and maintenance-free.

Docking stations may be capable of providing remote power to multiple UAVs, via a concentrated beam such as laser, microwave or other transmissions.

Figure 18A:
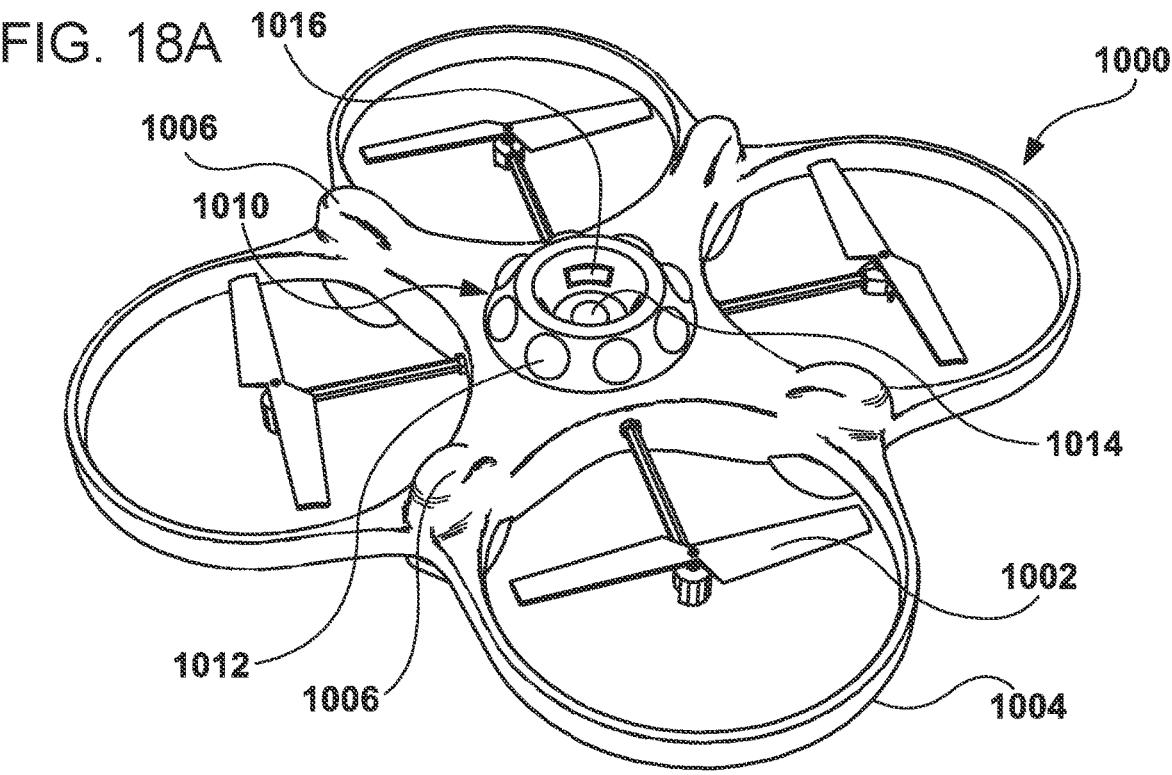
FIG. 18A depicts the side of a UAV with integrated docking port, and sensors and emitters to assist with autonomous docking and feet or legs for landing.

FIG. 18A depicts the side of a UAV with a docking port, and sensors and emitters to assist with autonomous docking and feet or legs for landing. While the UAV may fly and dock with this side up, by controlling the spin direction of its rotors, it can also invert itself during flight and land or dock with this side down. UAVs and receiving docking ports may be at any orientation, such that UAVs can dock underneath a docking mechanism, on top of it or sideways against it. Docking ports can therefore be mounted under ceilings, against walls or on flat or angled surfaces or on moving objects that that may change their orientation at any time while moving. Being able to mount docking devices under ceilings, for example, provides a significant benefit in space savings and in keeping UAVs from getting in the way of people, etc.

Figure 18B:
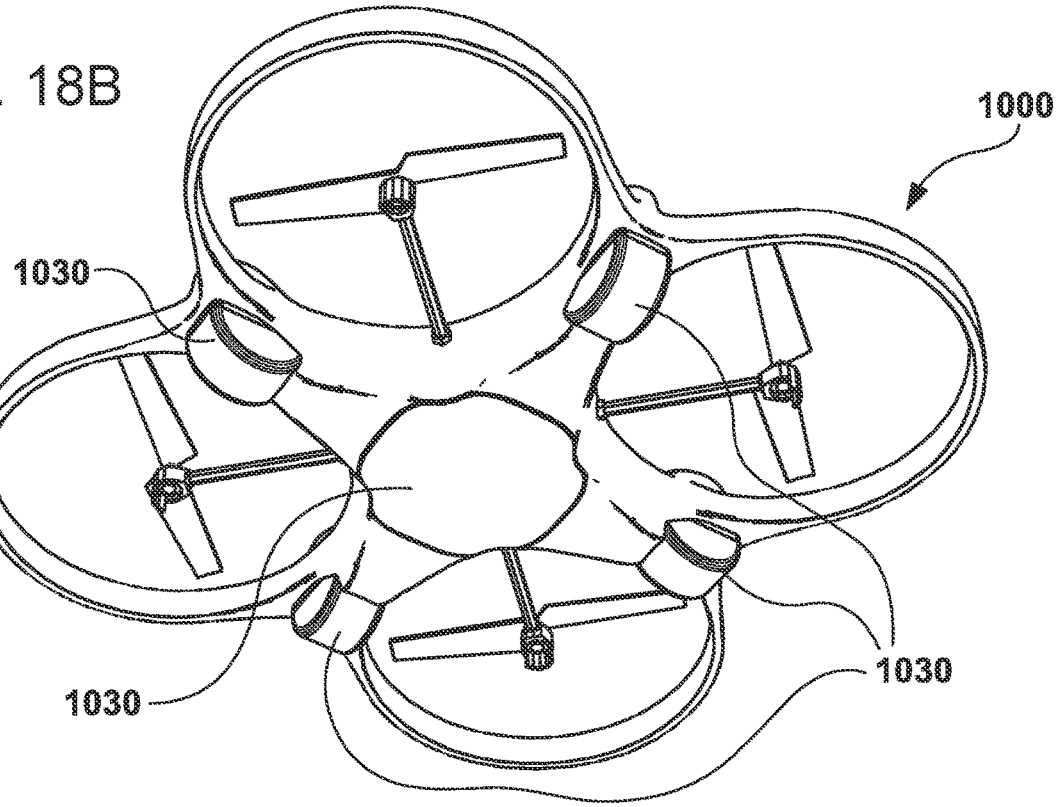
FIG. 18B depicts the side of a UAV with cameras and sensors for surveillance, filming, communications, and other purposes.

FIG. 18B depicts the side of a UAV with cameras and sensors for surveillance, filming, communications, and other purposes. Typically this side would face down during flight, but the UAV may be capable of inverting itself during flight, with this side facing up. Cameras may include plenoptic and omni-directional cameras capable of concurrently observing and recording at multiple zoomed distances, resolutions, fields-of-view, apertures, focal points, as well as recording surround video for display in virtual-reality and augmented-reality headsets, IMAX theaters, etc. Cameras can be in fixed positions and/or on gimbal mounts as well as mounts that can change their orientation upon remote or autonomous command.

FIG. 19 depicts two UAVs docked with each other while in flight. Depicted UAVs have docking mechanisms on both upper and lower surfaces. Said docking mechanisms may be configured so that female ports are on their tops and male ports underneath, or vice-versa. Alternatively, docking ports may be non-gendered and configured so that either side of a UAV can dock with either side of another UAV. Emitters and sensors around and in the docking mechanisms enable the UAVs to locate and track each other for accurate docking. In addition to vertical stacking of UAVs, UAVs can connect at their sides, allowing for three-dimensional arrays of interconnected flying UAVs.

Figure 19A:
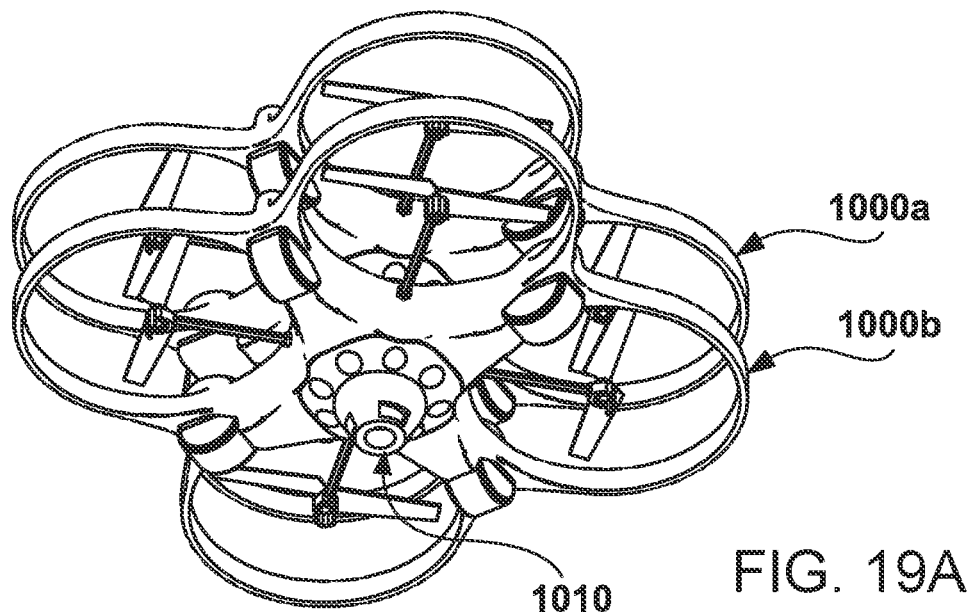
FIG. 19A depicts a plurality of UAVs capable of docking with each other while in flight.
Figure 19B:
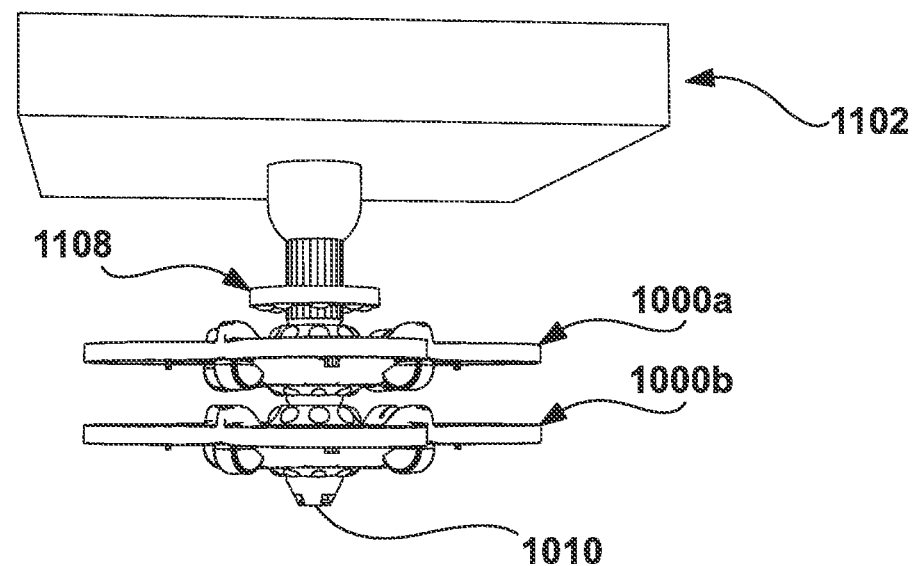
FIG. 19B depicts a plurality of UAVs with integrated docking ports on their top sides and undersides, and capable of docking with each other while stacked together on a docking station.

FIG. 19B depicts multiple UAVs stacked on a single docking station. UAVs can individually dock and undock from each other and the station, or can dock with each other while flying and then dock on a station.

Figure 20A:
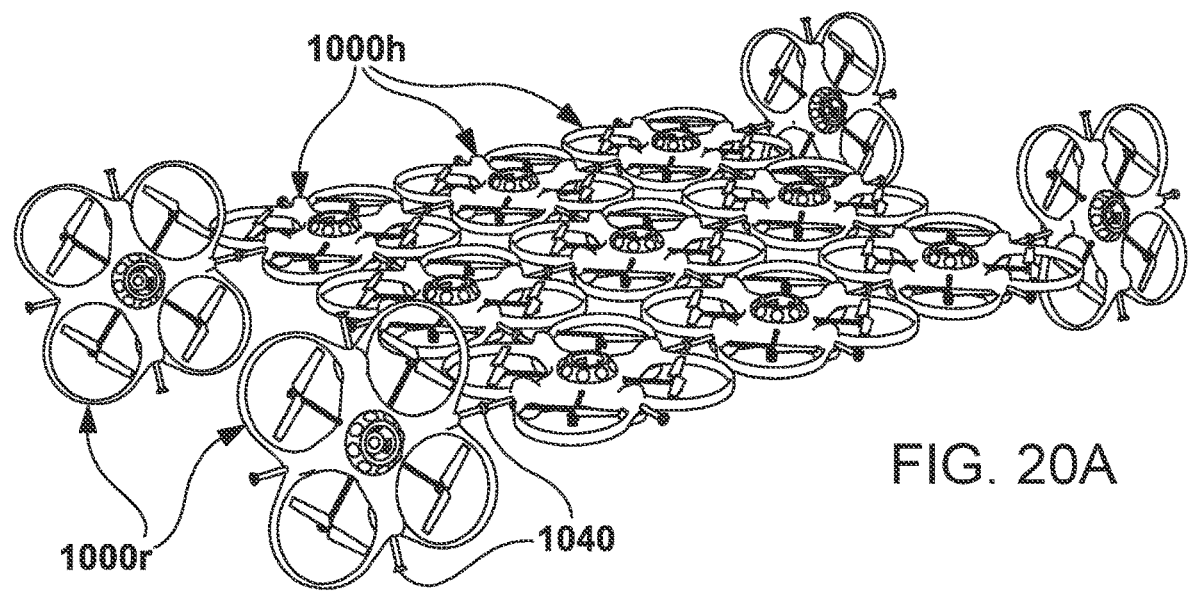
FIG. 20A depicts an interconnected matrix of multiple UAVs that are docked with each other.

FIG. 20A depicts an interconnected matrix of multiple UAVs that are docked laterally with each other for the purpose of range and altitude extension. UAVs are capable of dynamically forming groups of various size, shape and capabilities. Docking ports may be configured, as depicted to allow UAVs to articulate their orientations relative to adjacent connected UAVs. For example, in the depiction, the central group of UAVs are generating vertical lift, while the outer UAVs are oriented to provide forward directional thrust.

Figure 20B:
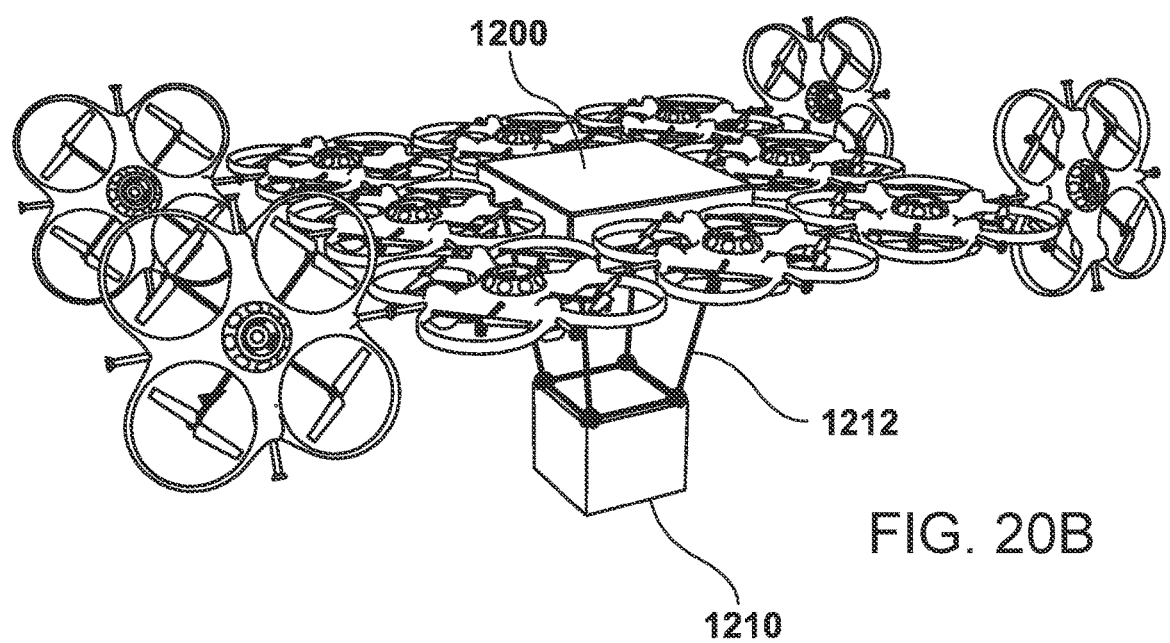
FIG. 20B depicts a matrix of connected UAVs capable of dynamically coordinating themselves to be able to carry a range-extending power pack and/or payload.
Figure 21A:
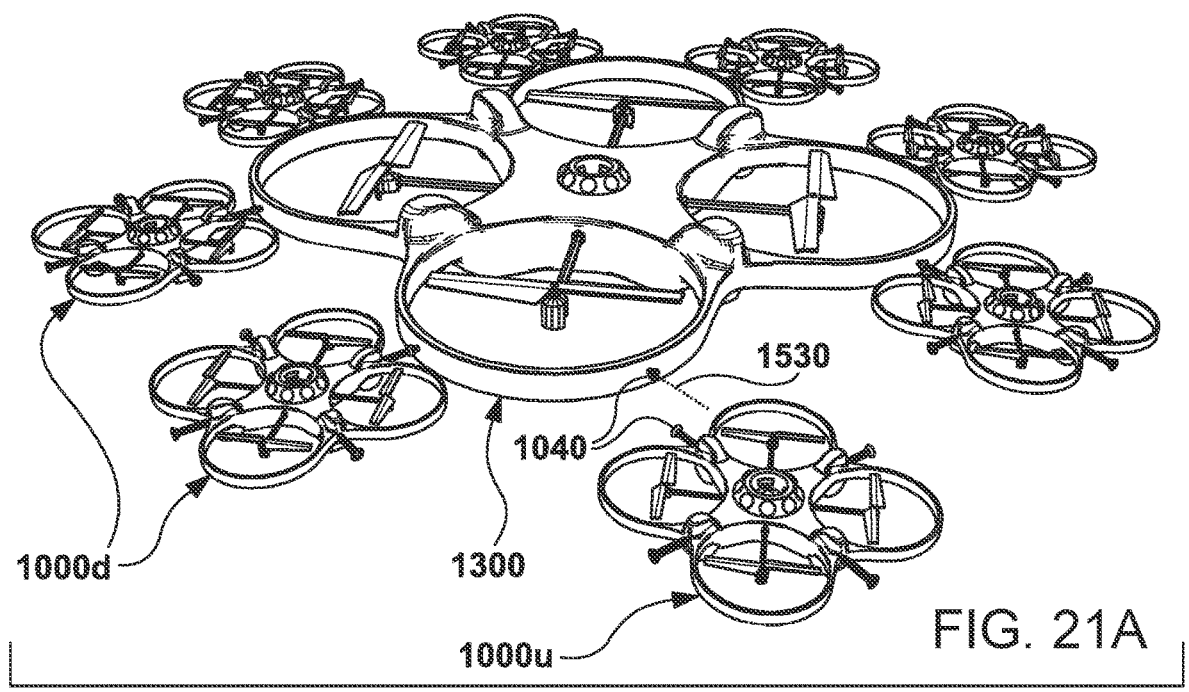
FIG. 21A depicts a matrix of smaller UAVs docked with a larger "mothership" UAV.
Figure 21B:
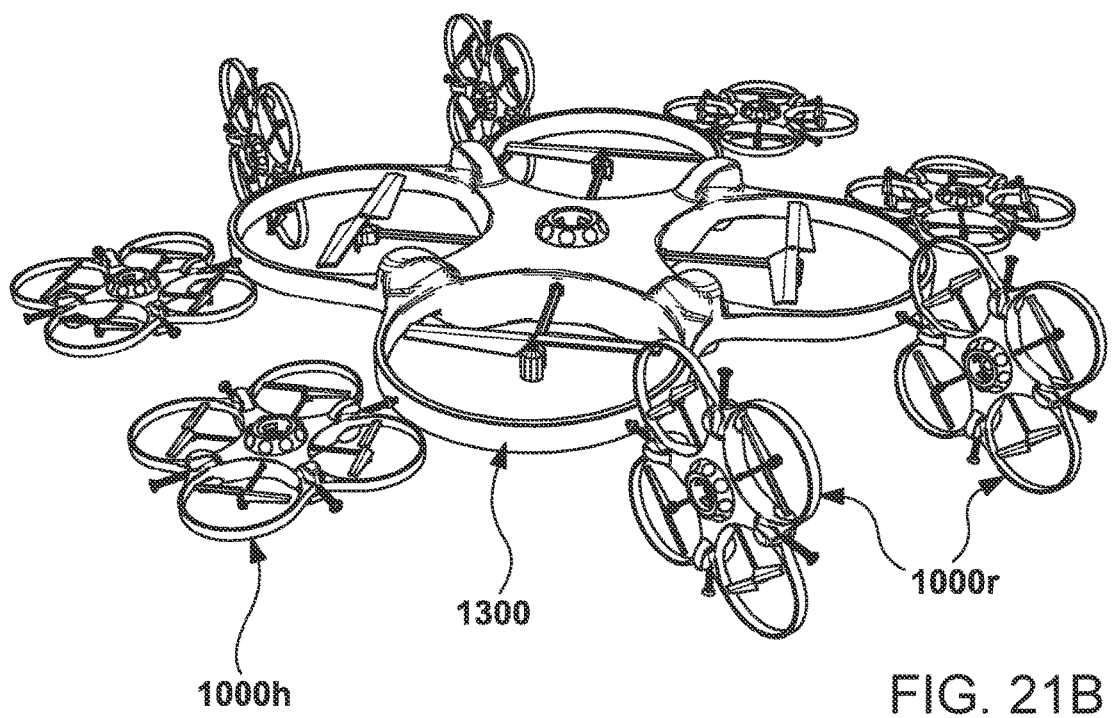
FIG. 21B depicts the same a matrix of connected UAVs as in FIG. 21A, but with some UAVs rotated in order to provide forward thrust.

FIG. 20B depicts a matrix of connected UAVs capable of carrying a range-extending power pack as well a payload for delivery. This allows the number of UAVs to be dynamically adapted to suit the weight and size of a package as well as the distance to be flown for the mission. UAVs that are not directly docked with each other can also coordinate with each other to jointly carry a package or a net that can be dropped on a target, such as a wild animal for conservation purposes FIGS. 21A-B depict a matrix of smaller UAVs docked with a larger "mothership" UAV. This allows for range-extension, more energy efficient flight, and for the mothership to release the smaller UAVs over a target area and coordinate their operations from a higher altitude, where it may have improved communications with remote base operations such as via line of sight or satellite communications. The mothership may take a variety of forms, including airships, blimps, UAVs and aircraft.

FIGS. 22A-C depict a mobile vehicle-mounted UAV docking stations, with UAVs capable of autonomous, semi-autonomous or remote controlled operations. Such mobile docking stations may be mounted to any vehicle, including but not limited to wheeled land vehicles, aircraft, waterborne vessels, such as ships, and submarines.

Figure 23:
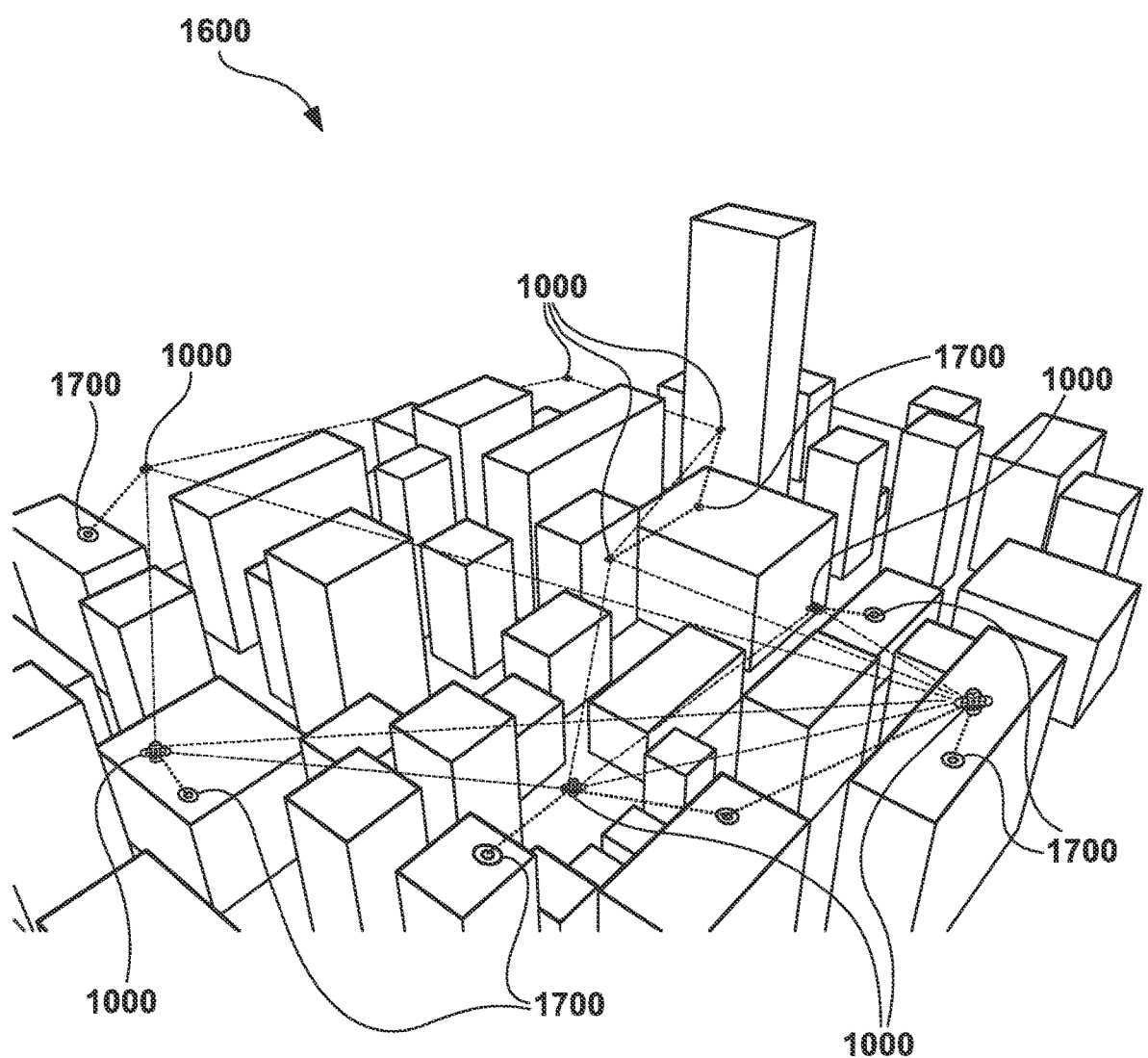
FIG. 23 depicts an urban landscape with non-moving and mobile UAV docking stations, and an array of UAVs, both airborne and docked.

FIG. 23 depicts an urban landscape in which a series of UAV docking and support stations mounted on buildings, streets and elsewhere as well as mobile platforms, and an array of UAVs, both airborne and docked. UAVs and docking ports can communicate with each other to create a web of coverage across the city. Docking stations may also be capable of providing remote power via concentrated beams to airborne UAVs.

Figure 24:
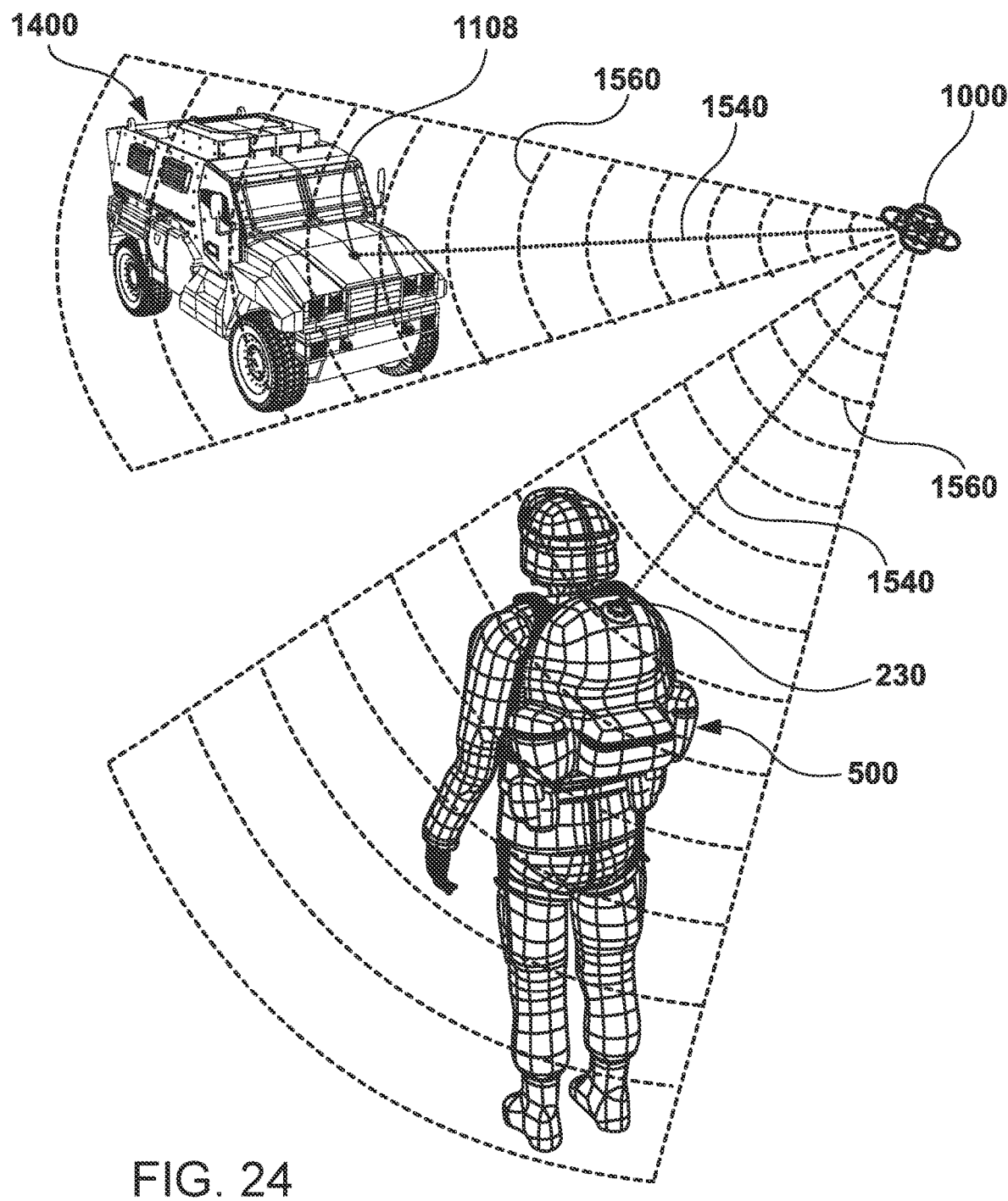
FIG. 24 depicts a UAV tracking multiple obstacles or moving targets concurrently, and generating a virtual map of its environment using its sensor array.

FIG. 24 depicts a UAV. FIG. 25 illustrates some of the capabilities and considerations in autonomous UAV operations and docking. Other factors may include acquisition and tracking of target using sensor arrays (optical, IR, laser, RF, etc.), computation of distance to target, direction and speed/acceleration of target, environmental factors such as wind speed, altitude and air pressure, gravitational pull, and potential obstacles, orientation of target, etc.

FIG. 1A through 3B illustrate perspective views of a helmet 200 and UAV control eyewear 300 with a docking port 220 for a compact personal UAV 100, as well as a UAV 100 configured to be able to launch from and land on said helmet 200, in accordance with an embodiment of the present disclosure. Said UAV 100 can incorporate cameras 150 and sensors in various arrangements, a power source 140, propulsion systems such as rotor blades 110, which may be shrouded by rings 120 or shrouds or cages, and arms 130 optionally capable of articulating or bending in order to change the attitude of propulsion systems 110 for improved flight control, and also to enable the UAV 100 to conform to the shape of the docking station 220 for compact, low-profile storage. Said helmet 200 incorporates a docking port 230 that engages with a docking mechanism 160 on said UAV 100, and which can provide automated locking/securing, charging or refueling and data connectivity capabilities for said UAV 100. Said docking port may incorporate target beacons 240, which make it easier for said UAV to accurately dock with said helmet. Said docking port beacons 240 or landing assistance mechanisms may incorporate any combination of visual markers, infra-red emitters, lasers, lights, radio, sonic, or ultra-sonic emitters, or other means of guiding said UAV into the docking port. Said UAV may incorporate complimentary sensors capable of using the beacons or other means for guiding itself onto the helmet docking port. Said dock may emit a "homing beam" 1500, which may emit approximately perpendicular to the dock port. Said homing beam may take the form of light, laser, infra-red, radio waves or any other spectra and may be used to assist a drone in targeting the dock when docking. In addition, triangulation lines 1510 indicate drone identification of target position and orientation. Said helmet docking port may incorporate cameras 210 and other sensors and supporting systems capable of gathering video, audio, night-vision footage and other sensor information and feeding such information in real-time to the wearer 310 by means of heads-up display or projection system or digital display integrated into the wearer's eyewear 300 and microphones integrated into the helmet docking port 200 or earphones, as well as to other friendly combatants, and remote battle coordinators. Said UAVs may also act as aerial relays for information or data feeds between friendly troops. Applications are not limited to military use and may include sports, exploration, surveying, wildlife management, policing, game play such as electronic tag or paintball games, etc. A homing beam 1500 may be emitted in the form of laser, infra-red, microwave, or other spectra for the purpose of guiding a drone to land. In addition or alternatively, sensors and emitters on the drone and dock and communications between the drone and docking system. Triangulation lines 1510 indicate targeting and orientation determination for successful docking.

FIG. 4A depicts an armed compact personal UAV 400 with one or more cameras 140 and a projectile launcher 450, in this case with two barrels, according to some embodiments. The launcher may fire lethal or non-lethal weapon systems, such as small anti-personnel devices. According to one embodiment, such systems may include $CO_2$ propelled anti-personnel projectiles, explosive darts for combat situations, electrical stun-darts for neutralization of criminals or combatants, tear gas canisters, stun grenades, or drug-dosing darts such as may be useful for game wardens.

FIG. 4B-C illustrate perspective views of the UAV 400 docked onto the user's helmet 200, in accordance with an embodiment of the present disclosure. Cameras, sensors and projectile launchers may be configured to be able to function while on the helmet, according to some embodiments. The helmet-wearer is able to control the UAV functions and view live camera and sensor feeds from said UAV in a digital display. Such digital display may be built into eyewear, face mask, contact lenses, etc. or be a projected heads-up display. The user may optionally also be able to aim and fire projectiles from the UAV 400 while it is docked as depicted in FIG. 4C, or while it is in the air.

FIG. 5 illustrates a perspective view of a personal UAV 100 which has landed on terrain 380 or surface other than a docking station, in accordance with an embodiment of the present disclosure. In the depicted embodiment, the rotor blades remain protected because the UAV arms 130 are able to articulate such that the edges of the protective rings 120 around the rotor blades can act as feet. Alternatively, the arms may be configured to articulate up and out of the way, enabling the UAV to land on its central body or legs that may extend therefrom.

FIG. 6 illustrates a perspective view of a personal UAV 100, which has landed on terrain 380 or surface other than a docking station, and in which the protective rings incorporate hubless wheels 122, in accordance with an embodiment of the present disclosure. The depicted UAV is capable of traversing over terrain 380 on said wheels 122, as well as flying and landing.

FIG. 7A illustrates a perspective view of a backpack 500 and backpack-mounted UAV 100, in accordance with an embodiment of the present disclosure. Said UAV may be capable of launching from said backpack 500 and landing and docking on said backpack. Said backpack 500 may optionally incorporate an integrated docking port and UAV fasteners or fastening system, with charging and/or refueling and data connectivity capabilities. Alternatively, such functions may be provided by a backpack attachment docking port that may work with a variety of different backpacks.

FIG. 7B illustrates a perspective view of a backpack 500 and backpack-mounted drone 1000, in which said drone does not change or adapt its shape to conform to the shape of the docking surface below.

FIG. 8 illustrates a perspective view of a boot 600 and boot-mounted UAV 100 in accordance with an embodiment of the present disclosure. The boot 600 or shoe or other footwear may have an integrated docking port or the docking port may be an attachable device that can work with conventional boots, shoes and footwear of various sizes and shapes.

FIG. 9A-C illustrates perspectives view of an attachable shoe-mounted UAV docking port 700 with docked UAV 100, in accordance with an embodiment of the present disclosure. FIG. 9A shows the UAV 100 docked and secured to a shoe 610, with the UAV 100 having conformed its shape to the shoe 610 or to other footwear. FIG. 9B shows the UAV 100 with arms extended into flight position as it prepares for take-off, or having landed, just prior to conforming its shape to the footwear. FIG. 9C shows the UAV 100 hovering above the shoe 610, having launched or preparing to land. The attachable docking port 700 is visible and may take any form. In the depicted version, the docking port 230 makes use of a clip 250 that allows it to be secured to the laces 620 of the shoe. The docking port 230 may use any other means of attachment to the footwear.

FIG. 10 illustrates a perspective view a UAV or remote-controlled vehicle 100 that can drive over terrain and dock with a shoe 610 or boot, in accordance with an embodiment of the present disclosure. The depicted UAV is capable of both flying and rolling on the ground, in accordance with an embodiment of the present disclosure, but may alternatively be capable of just one of these two modes of transport. The footwear may incorporate integrated mechanisms or devices 710 for securing said UAV when docked, and for assisting said UAV in locating the footwear prior to docking. Said footwear may incorporate any combination of auxiliary batteries, solar panels and piezo-electric generator that generates power from walking or running, in accordance with an embodiment of the present disclosure.

FIG. 11 illustrates a perspective view of a vest 800, such as might be used for military or law enforcement ballistic protection, with integrated docking ports for one or more UAVs 100, in accordance with an embodiment of the present disclosure. UAVs may be launched and docked by hand or autonomously.

FIG. 12 illustrates a perspective view of a vest 810, such as might be used for military or law enforcement ballistic protection with modular attachable docking ports 700 for one or more UAVs 100, in accordance with an embodiment of the present disclosure. In the depicted embodiment, said docking ports 100 have additional locking mechanisms 150 or grips for securing the UAVs.

FIGS. 13A-B illustrate perspective views of outerwear 900 such as a jacket, coat, shirt or vest in with an integrated UAV docking port 910 positioned approximately on the wearer's shoulder, in accordance with an embodiment of the present disclosure. Said outerwear 900 can provide charging and data connectivity capabilities with internal wiring 920 and pockets 940 to hold an auxiliary battery 930 and/or a solar or piezo-electric generator that generates power from the wearer's movement. Said UAV 100 may be able to autonomously, semi-autonomously or manually be launched from and land on said docking port 910. Said UAV 100 may be controllable via any remote control device, including but not limited to a smart-phone, smart-watch, hand-held flight controller, smart eye-wear, body motion sensors, voice-control or brain-pattern recognition sensors.

FIG. 14 illustrates a perspective view of outerwear 900 such as a jacket, coat, shirt or vest in with an integrated UAV docking port 930 positioned approximately on the wearer's chest, in accordance with an embodiment of the present disclosure. Said docking port 930 may optionally provide charging and data connectivity features as discussed for the two previous figures.

FIG. 15 illustrates a perspective view of outerwear 900 such as a shirt, with an attachable UAV docking port 700 clipped onto an exterior pocket 950, in accordance with an embodiment of the present disclosure.

FIGS. 16A-C, and 17A-C depict UAV docking stations 1100 capable of docking and charging or refuelling multiple UAVs 1000 concurrently. Said UAVs are depicted as either docked 1000d or undocked 1000u. Structures 1100 for supporting one or more UAV docking stations 1108 may be connected to the power grid and communications networks and/or may optionally generate power for charging UAVs and powering communications from renewable sources such as solar, wind or wave energy. An example of said renewable sources may optionally include solar panels 1102, as depicted. Structures 1100 for supporting UAV docking stations 1108 may provide shelter and protection for UAVs from weather and other threats. Docking ports 1108 may be supported by structures, such as those depicted by 1104, which can provide shelter for UAVs from the elements, and may optionally enclose UAVs when docked. Docking stations 1108 may be mounted on poles such as lamp posts, (as depicted here) that can incorporate street or area lamps 1106. Other structures may include but are not limited to telecommunications poles and towers, power pylons, and street signs, and may be positioned at street level, on building rooftops or building sides or inside buildings or underground facilities, or in or on vessels such as ships, vehicles, airships, aircraft, mothership UAVs, or anywhere else.

Docking stations 1108 may include arrays 1110 of sensors and transmitters for tracking and communicating with undocked UAVs 1000u. Docking ports 1112 may incorporate structures or mechanisms 1114 for sensors on undocked UAVs 1000u to lock onto for secure docking and retention of docked UAVs. Docking ports may optionally emit a "homing beam" 1530 of visible light, infra-red, or laser that an undocked UAV 1000u can use to sense when it is in direct line with said docking port for accurate docking throughout the landing procedure.

UAVs may perform useful functions while docked. For example, depicted UAVs may spend most of their time operating as pole-mounted security cameras, and only undock and fly when instructed to pursue or follow a moving target. Targets may be tracked by a variety of markers, such as visual recognition, pattern recognition, infra-red or ultra-violet signature, biometric characteristics (walk gait characteristics, face/iris recognition, etc.), or tags attached to the target such as tracking transmitters, RFID tags, dye or DNA-infused spray (such as used by some security devices to tag an intruder or thief), radioactive dot or RFID chip on target, etc. Docking ports may incorporate moving parts for locking onto UAVs or alternatively, said moving parts may be integrated into the UAVs. The latter configuration would enable the UAVs to dock and undock autonomously without relying on action or permission from the docking station, and simplifies construction of docking stations without moving parts, thereby making them more durable and maintenance-free.

Docking stations may be capable of providing remote power to multiple UAVs, via a concentrated beam such as laser, microwave or other transmissions.

FIG. 18A depicts the side of a UAV 1000 with a docking port 1010, and arrays of sensors, cameras and emitters 1012 to assist with autonomous docking and feet or legs for landing. Centrally positioned sensors and/or cameras 1014 are able to detect when the UAV is in direct line with a docking port's "homing beam" throughout the docking procedure, and latching mechanisms 1016 provide the UAV with the ability to lock onto the docking port. Static or retractable landing gear or feet 1006 may be provided to stabilize a UAV on a docking port or to enable a UAV to land on various surfaces without the docking port 1010 getting in the way. Depicted rotor blades 1002 may be protected by rings 1004 as depicted or other types of cages. While the UAV may fly and dock with the depicted side up, by controlling the spin direction of its rotors, it can also invert itself during flight and land or dock with the depicted side down. UAVs and docking ports 1112 may be at any orientation, such that UAVs can dock underneath a docking mechanism, on top of it or sideways against it. Docking ports 1112 can therefore be mounted under ceilings, against walls or on flat or angled surfaces or on moving objects that that may change their orientation at any time while moving. Being able to mount docking ports 1112 under ceilings, for example, provides a significant benefit in space savings and in keeping UAVs from getting in the way of people, and out of reach when docked, etc.

FIG. 18B depicts the side of a UAV 1000 with cameras and sensors for surveillance, filming, communications, and other purposes. Multiple cameras, sensors and emitters may be integrated or attached and may be inside protective housings 1030. Typically the depicted side would face down during flight for surveillance of the terrain below, but the UAV may be capable of inverting itself during flight, with this side facing up. Cameras may include plenoptic and omni-directional cameras capable of concurrently observing and recording at multiple zoomed distances, resolutions, fields-of-view, apertures, focal points, as well as recording surround video for display in virtual-reality and augmented-reality headsets, IMAX theaters, etc. Cameras can be in fixed positions and/or on gimbal mounts as well as mounts that can change their orientation upon remote or autonomous command.

FIG. 19A depicts two UAVs 1000a and 1000b docked with each other while in flight. UAVs may have docking ports 1010 on both upper and lower surfaces, allowing for multiple drones to be stacked together in flight or when docked. Said docking mechanisms may be configured so that female ports are on their tops and male ports underneath, or vice-versa. Alternatively, docking ports may be non-gendered and configured so that either side of one UAV can dock with either side of another UAV. Emitters and sensors around and in the docking mechanisms enable the UAVs to locate and track each other for accurate docking. In addition to vertical stacking of UAVs, UAVs can connect at their sides, allowing for three-dimensional arrays of inter-connected flying UAVs.

FIG. 19B depicts multiple UAVs 1000a and 1000b stacked on a single docking station 1108. UAVs can individually dock and undock from each other and the station, or can dock with each other while flying and then dock together on a docking station.

FIG. 20A depicts an interconnected matrix of multiple UAVs that are docked laterally with each other for the purpose of range and altitude extension. UAVs are capable of dynamically forming groups of various size, shape and capabilities. Docking ports may be configured, as depicted to allow UAVs to articulate their orientations relative to adjacent connected UAVs. For example, in the depiction, the central group of UAVs 1000h are generating vertical lift, while the outer UAVs 1000r are oriented to provide forward directional thrust. Side-mounted docking mechanisms 1040 enable the UAVs to dock with each other laterally.

FIG. 20B depicts a matrix of connected UAVs capable of carrying a range-extending power pack 1200 as well a payload 1210 for delivery. The payload may be suspended by cables or other structures 1212 with a mechanism for releasing said payload. The number of connected UAVs is able dynamically adapt to suit the weight and size of a package as well as the distance to be flown for the mission. UAVs that are not directly docked with each other can also coordinate with each other to jointly carry a package or a net that can be dropped on a target, such as a wild animal for conservation purposes FIGS. 21A-B depict a matrix of smaller UAVs 1000d docked with a larger "mothership" UAV 1300. This allows for range-extension, more energy efficient flight, and for the mothership to release the smaller UAVs over a target area and coordinate their operations from a higher altitude, where it may have improved communications with remote base operations such as via line of sight or satellite communications. The mothership may take a variety of forms, including airships, blimps, UAVs and aircraft. An undocked UAV 1000u is depicted approaching the mothership UAV 1300 to dock using docking mechanisms 1040 and optional "homing beam" 1530. In FIG. 21B, approximately horizontal UAVs 1000h are providing vertical lift, while forward facing UAVs 1000r are rotated to provide forward thrust.

FIGS. 22A-C depict vehicles 1400 with mobile vehicle-mounted UAV docking stations 1108, with docked UAVs 1000d and undocked UAVs 1000u capable of autonomous, semi-autonomous or remote controlled operations. Such mobile docking stations may be mounted to any vehicle, including but not limited to wheeled land vehicles, aircraft, waterborne vessels, such as ships, and submarines. Optional "homing beams" 1530 can assist with accurate docking. Generic beam 1540 may optionally depict remote communications, tracking of the docking station or a power beam from the docking station for providing continuous power to the UAV. Multiple beams 1540a and 1540b represent the optional ability for a single docking station to concurrently support multiple UAVs. 1550 represents communications and tracking between two or more UAVs so that they are able to autonomously coordinate their operations with each other.

FIG. 23 depicts an urban landscape 1600, in which a series of UAV docking and support stations 1700 mounted on buildings, streets and elsewhere as well as mobile platforms, and an array of UAVs 1000, both airborne and docked. UAVs and docking ports can communicate with each other to create a web of coverage across the city. Docking stations may also be capable of providing remote power via concentrated beams to airborne UAVs.

FIG. 24 depicts a UAV 1000 tracking multiple obstacles or moving targets concurrently, and generating a virtual map of its environment using its sensor array. Scan lines 1560 represent the three-dimensional mapping of the environment as it scans and builds a virtual mesh of physical objects in its surroundings. Said objects may include mobile docking platforms, such as the depicted vehicle 1400 with docking port 1108 and human with a backpack 500 and docking port 230. Lines 1540 represent Communications/tracking or power beams between docking ports and the UAV.

FIG. 25 illustrates some of the factors that the UAVs are able to take into account during autonomous, semi-autonomous tracking, communications and docking between UAVs and docking ports 1800. 1810 describes factors and sensor data the UAV is able to use to find the general location of a docking station. 1812 describes some of the factors and sensor data the UAV is able to use to keep track of a docking station once it has located it and has it in sight. 1814 describes some of the criteria that the UAV is able to autonomously use when deciding whether or not to dock. 1816 describes some of the factors and sensor data the UAV may optionally able to use to assist it with accurate docking. 1818 describes some of the actions that the UAV may autonomously perform after successful docking.

Other factors and sensory data in autonomous UAV operations may include acquisition and tracking of various targets, including docking stations, using sensor arrays (optical, IR, laser, RF, audio, etc.), computation of distance to target, direction and speed and acceleration rate of target, environmental factors such as wind speed, altitude and air pressure, gravitational pull, and potential obstacles, and orientation of target.

Throughout the description, similar or same reference numbers may be used to identify similar or same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

The invention claimed is:

1. A system comprising
an unmanned aerial vehicle having a body, a propulsion system, a communication device, a sensor, a power source, a controller system and at least one docking port, said body having a shape incorporating said propulsion system, said communication device, said sensor, said power source, said controller system and said at least one docking port, said propulsion system being operable to move said unmanned aerial vehicle, said communication device being operable to transmit a unmanned aerial vehicle communication signal, said sensor being operable to generate detected data based on a detected parameter, said power source being operable to provide power to said propulsion system, to said communication device, to said sensor and to said controller system, said controller system being operable to control, according to said generated data, said propulsion system, said communication device, said sensor and said power source; wherein said controller system is further operable to control said propulsion system to autonomously dock said at least one docking port with at least one other unmanned aerial vehicle docking port and/or at least one docking station docking port.

2. The system of claim 1, wherein said unmanned aerial vehicle further comprises an optical guidance system and wherein said optical guidance system includes at least one optical sensor and at least one light emitter, said at least one optical sensor and at least one light emitter being incorporated in said at least one docking port, and said optical guidance device being operable to determine relational position and/or distance to said at least one other unmanned aerial vehicle docking port.

3. The system of claim 2, wherein said optical guidance system includes an optical imaging system operable to map optical depth and/or image objects in a field of view of said at least one optical sensor.

4. The system of claim 2, wherein said optical guidance system includes an optical data transfer device and/or a wireless power transfer device.

5. The system of claim 1, wherein at least one said unmanned aerial vehicle docking port includes at least one communications, wired or wireless connector module and/or at least one power source, wired or wireless connector module operable to connect with at least one communications connector and/or at least one power source connector of said at least one docking port of said at least one other unmanned aerial vehicle or of said at least one docking station.

6. The system of claim 5, wherein said controller is further operable to control said at least one power connector to control power transfer to said power source from a power supply of said at least one other unmanned aerial vehicle or said at least one docking station.

7. The system of claim 1, wherein said at least one docking port of said unmanned aerial vehicle includes a local wireless communications module operable to communicate with a corresponding wireless communications module of said at least one docking port of the at least one other unmanned aerial vehicle or of at least one said docking station.

8. The system of claim 1, wherein said unmanned aerial vehicle further comprises a networking system operably connected to said at least one docking port, said networking system being operable as a network hub or node and/or sensor hub or node of a group of networked docking ports of at least one other unmanned aerial vehicles and/or docking stations.

9. The system of claim 1, where said at least one unmanned aerial vehicle docking port includes a data processing system, said data processing system being operable to process at least one of light and optical depth mapping, imaging, location, orientation and other sensor data, flight, navigation, networking, docking, launching, charging, power transfer, induction, distribution, power management and/or other operational data independent of and/or in coordination with a data processing module of said at least one other unmanned aerial vehicle or of said at least one docking station.

10. The system of claim 1, further comprising an article of clothing including said docking station, wherein said controller is operable to control said propulsion system to dock said at least one unmanned aerial vehicle docking port with a docking port of said at least one docking station.

11. The system of claim 10, wherein said article of clothing comprises headwear, eyewear, armwear, footwear or other bodywear.

12. The system of claim 11, wherein the shape and/or configuration of said body of said at least one unmanned aerial vehicle is adjustable between a first configuration in which the body is shaped and/or configured in a flying orientation and a second configuration in which the body is shaped and/or configured to confirm with or cooperate with the docking station and optionally a surrounding region of the article of clothing.

13. The system of claim 1, further comprising a wearable docking station, wherein said controller is operable to control said propulsion system to dock said at least one docking port of said at least one unmanned aerial vehicle with a docking port of said wearable docking station.

14. A method of operating an unmanned aerial vehicle comprising
 a. processing an unmanned aerial vehicle communication signal,
 b. generating detected data based on a detected parameter,
 c. powering a propulsion system of said unmanned aerial vehicle to move said unmanned aerial vehicle,
 d. controlling said propulsion system according to said generated data, wherein controlling said propulsion system includes controlling said propulsion system to dock a docking port of said unmanned aerial vehicle with a corresponding docking port of another unmanned aerial vehicle or of a docking station.

15. The method of claim 14, further comprising receiving, wireless or wired, power to said docking port of said unmanned aerial vehicle from said corresponding docking port of the another unmanned aerial vehicle or of said docking station, and charging a power source of said unmanned aerial vehicle using said receiving power.

16. The method of claim 14, further comprising transmitting, wirelessly or wired, data communication between said docking port of said unmanned aerial vehicle and corresponding docking port of the another unmanned aerial vehicle or of said docking station.

17. The method of claim 14, further comprising
 e. networking said docking port of said unmanned aerial vehicle with docking ports of other unmanned aerial vehicles and/or of other docking stations.

18. The method of claim 14, wherein controlling said propulsion system further includes controlling said propulsion system to dock the docking port of said unmanned aerial vehicle with a corresponding docking port of a wearable docking station or a docking station incorporated into an article of clothing.

19. A docking port operable to connect physically and, optionally electrically and optionally optically, with a docking port of the unmanned aerial vehicle of the system of claim 1.

20. The docking port of claim 19, wherein said docking port is wearable or incorporated into an article of clothing.

* * * * *